(12) United States Patent
Barman

(10) Patent No.: US 10,699,264 B1
(45) Date of Patent: Jun. 30, 2020

(54) APP-LESS RESTAURANT PROCESSING SYSTEM USING MOBILE DEVICES

(71) Applicant: UP N' GO, San Diego, CA (US)

(72) Inventor: Touradj Barman, San Diego, CA (US)

(73) Assignee: UP N' GO, San Diego, CA (US)

(*) Notice: Subject to any disclaimer, the term of this patent is extended or adjusted under 35 U.S.C. 154(b) by 0 days.

(21) Appl. No.: 16/683,252

(22) Filed: Nov. 13, 2019

Related U.S. Application Data

(63) Continuation of application No. 15/446,849, filed on Mar. 1, 2017.

(60) Provisional application No. 62/413,236, filed on Oct. 26, 2016, provisional application No. 62/302,472, filed on Mar. 2, 2016.

(51) Int. Cl.
| | |
|---|---|
| *G06Q 20/32* | (2012.01) |
| *G06Q 50/12* | (2012.01) |
| *G06Q 20/20* | (2012.01) |
| *G06Q 20/24* | (2012.01) |
| *G06Q 20/02* | (2012.01) |
| *G06Q 20/10* | (2012.01) |

(52) U.S. Cl.
CPC ......... *G06Q 20/3276* (2013.01); *G06Q 20/02* (2013.01); *G06Q 20/102* (2013.01); *G06Q 20/20* (2013.01); *G06Q 20/24* (2013.01); *G06Q 50/12* (2013.01)

(58) Field of Classification Search
CPC ............................. G06Q 20/3276; G06Q 20/02
See application file for complete search history.

(56) References Cited

U.S. PATENT DOCUMENTS

| | | | |
|---|---|---|---|
| 9,811,810 B1 | 11/2017 | Ranganath et al. | |
| 2007/0288322 A1 | 12/2007 | Watanabe | |
| 2009/0187820 A1 | 7/2009 | Stinson et al. | |
| 2012/0185382 A1 | 7/2012 | Fischer | |
| 2012/0253852 A1* | 10/2012 | Pourfallah | G06Q 20/3276 705/4 |
| 2013/0013499 A1 | 1/2013 | Kalgi | |
| 2013/0346302 A1* | 12/2013 | Purves | G06Q 20/102 705/40 |
| 2014/0067498 A1 | 3/2014 | De et al. | |
| 2014/0092413 A1 | 4/2014 | Shibata | |

(Continued)

OTHER PUBLICATIONS

U.S. Office Action in U.S. Appl. No. 15/446,849 dated May 15, 2019, 35 pages.

(Continued)

*Primary Examiner* — A. Hunter Wilder

(57) ABSTRACT

Systems and methods are disclosed to facilitate payment of a restaurant bill via text message. For example, a text message having a restaurant bill code may be sent from a customer device to an MPS phone number. A restaurant network address may be extracted for a restaurant computing system. A query may be sent to the restaurant computing system using the restaurant network address with the restaurant bill code. In response, the restaurant computing system may send restaurant bill data that includes least one restaurant menu item, a price for the at least one restaurant menu item, and a total bill amount. A unique URL may be created that when entered into a web browser presents a webpage that includes at least the restaurant bill data. The unique URL may be used by the customer to pay the restaurant bill.

20 Claims, 14 Drawing Sheets

(56) References Cited

U.S. PATENT DOCUMENTS

| | | | |
|---|---|---|---|
| 2014/0310117 A1* | 10/2014 | Moshal | H04L 63/083 |
| | | | 705/23 |
| 2014/0372319 A1* | 12/2014 | Wolovitz | G06Q 30/06 |
| | | | 705/71 |
| 2015/0073907 A1 | 3/2015 | Purves et al. | |
| 2015/0100490 A1 | 4/2015 | Agapitov | |
| 2015/0206395 A1 | 7/2015 | Chung | |
| 2015/0254627 A1* | 9/2015 | Bell | G06Q 20/29 |
| | | | 705/24 |
| 2016/0127234 A1 | 5/2016 | Vanska et al. | |
| 2017/0004582 A1 | 1/2017 | Engstrom et al. | |
| 2017/0109843 A1* | 4/2017 | Berg | G06Q 50/12 |
| 2017/0256007 A1* | 9/2017 | Barman | G06Q 50/12 |

OTHER PUBLICATIONS

U.S. Office Action in U.S. Appl. No. 15/446,849 dated Jan. 7, 2020, 22 pages.

\* cited by examiner

300

To pay by phone, text 62/1 to 619-234-5000

APP-LESS RESTAURANT PROCESSING SYSTEM USING MOBILE DEVICES

CROSS REFERENCE TO RELATED APPLICATIONS

This application is a non-provisional application, and claims the benefit of, U.S. Provisional Patent Application Ser. No. 62/302,472, entitled "MOBILE PAYMENT SYSTEM OR REUSABLE PAYMENT IDENTIFIER," filed Mar. 2, 2016, the entire disclosure of which is incorporated herein by reference for all purposes. This application is a non-provisional application, and claims the benefit of, U.S. Provisional Patent Application Ser. No. 62/413,236, entitled "TEXT PAYMENT SYSTEM," filed Oct. 26, 2016, the entire disclosure of which is incorporated herein by reference for all purposes.

BACKGROUND

One process by which customers pay for their meals at a table service restaurant involves many steps, requiring much time of the server and the customer. This inefficiency can cost restaurants money and customers time and inconvenience.

The process typically requires a customer to get a server's attention and request the check. The server then goes to the restaurant POS to make sure all items are on the tab correctly, closes the tab and then prints the check. The server then drops the check at the table and walks away, giving the customer time to review the check and supply payment.

When the customer is ready to pay, he or she must again get the server's attention. The server returns to the table to accept one or more forms of payment, along with any instructions how to split the payment, say among multiple payers. The server goes to the restaurant POS to process the payment, sometimes according to complex division of payment instructions, then returns the check in the form of the processed payment slip to the customer, so the customer can add a tip and sign.

Usually after the customer has left, the server returns to the table and collects the signed check with the tip amount entered. The server takes this to the restaurant POS to enter the tip amount, finalize the payment processing, and close out the check marking it as paid. At the end of the workday, any adjustments are made, the charges are batched and sent to a credit card processor for payment.

This process can be more complicated if there are multiple customers, multiple forms of payment, multiple tabs per table, tabs without a table, such as at a bar, etc.

SUMMARY

Embodiments of the invention include a method for facilitating payment of a restaurant bill using a text message network.

The method may include receiving, at a text payment server, a message from a customer device via a first network. In some embodiments, the first network includes a text message network. In some embodiments, the message is received from the customer device and the message has a customer phone number, the message is sent as a text message to an MPS phone number, and the message comprises a restaurant bill code. In some embodiments, the message may be received as a text message at a text message server and forwarded text payment server.

In some embodiments, the method may include extracting, at the text payment server, a restaurant bill retrieval information from a database using the MPS phone number. The method may further include sending, from the server, a query to a restaurant computing system (or server or a third-party computing system) using the restaurant bill retrieval information via a second network. The query might include the restaurant bill code. The restaurant bill data can then be received from the restaurant computing system at the text payment server from the restaurant computing system via the second network. The restaurant bill data may include, for example, at least one restaurant menu item, a price for the at least one restaurant menu item, and a total bill amount.

In some embodiments, the method may also include creating a unique URL that when entered into a web browser of a user device presents a webpage that includes at least the restaurant bill data and a customer-interactive payment field. The unique URL can be sent to the customer device using the customer phone number via the first network such as, for example, as a text message. In some embodiments, the URL can include encoded restaurant information and/or an encoded restaurant bill code that can be used by the text payment server to create a webpage that includes at least the restaurant bill data and a customer-interactive payment field. Alternatively or additionally, the unique URL can include an identifier that can be used to retrieve or create a webpage that includes at least the restaurant bill data and a customer-interactive payment field.

In some embodiments, the method may also include receiving credit card information from the customer device via the second network, wherein the credit card information is entered via the webpage; and sending the credit card information to a credit card processing system via the second network.

In some embodiments, the method may include sending a confirmation code to the customer device indicating that the transaction has been completed successfully.

In some embodiments, the credit card processing system comprises at least in part the restaurant computing system. In some embodiments, the credit card processing system comprises a third-party credit card processing system. In some embodiments, the first network and the second network include at least one common communication network. In some embodiments, the second network does not include a text message network.

In some embodiments, the method may further include receiving geolocation data from the customer device; and sending the geolocation data to the restaurant computing system using the restaurant network address.

In some embodiments, the method may further include sending the customer phone number to the restaurant computing system using the restaurant network address via the second network.

In some embodiments, the webpage includes a customer-interactive code entry field; and the method further includes sending a verification code to the customer device via the first network;

receiving a customer-entered verification code from the customer device via the webpage; and sending the verification code and the customer-entered verification code to the restaurant computing system using the restaurant network address via the second network.

In some embodiments, the method may include sending the customer phone number to the restaurant computing system using the restaurant network address via the second network.

In some embodiments, the webpage may include a signature entry field; and the method may further include: receiving a signature from the customer device via the webpage; and sending an image of the signature to the restaurant computing system using the restaurant network address via the second network.

In some embodiments, the method further includes receiving a photograph (or image captured in real time with a time stamp) from the customer device via the second network or the first network; and sending the photograph to the restaurant computing system using the restaurant network address via the second network.

Some embodiments may include receiving restaurant bill data from a restaurant computer system that includes at least one restaurant menu item, a price for the at least one restaurant menu item, a total bill amount, and a restaurant bill code; storing the restaurant bill data in a database in relation to a restaurant bill code; receiving a text message from a customer phone number, directed to an MPS phone number, and having a restaurant bill code; extracting the restaurant bill data from the database using the restaurant bill code; creating a unique URL that when entered into a web browser presents a webpage that includes at least the restaurant bill data and a customer-interactive credit card payment field; sending the unique URL to the customer device via the customer phone number; receiving credit card information from the customer device, wherein the credit card information is entered via the webpage; and sending the credit card information to a credit card processing system.

In some embodiments, the restaurant bill data is extracted from the database using the restaurant bill code and the MPS phone number.

In some embodiments, the method may further include finding a restaurant identifier based on the MPS phone number; and wherein the restaurant bill data is extracted from the database using a restaurant identifier.

In some embodiments, the text message may be received via a network that includes a text message network; the unique URL is sent to the customer device via the network that includes the text message network; the restaurant bill data is received via a computer network that does not include a text message network; and the credit card information is received via the computer network.

In some embodiments, the webpage includes a signature entry field; and the method may further include receiving a signature from the customer device via the webpage; and sending the signature to the restaurant computing system using the restaurant network address via the second network.

In some embodiments, the method may further include receiving geolocation data from the customer device; and sending the geolocation data to the restaurant computing system using the restaurant network address.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

FIG. 3 is an example restaurant bill according to some embodiments.

DETAILED DESCRIPTION

Systems and methods are disclosed for executing payments for a restaurant bill using a text messaging service.

Figure 1:
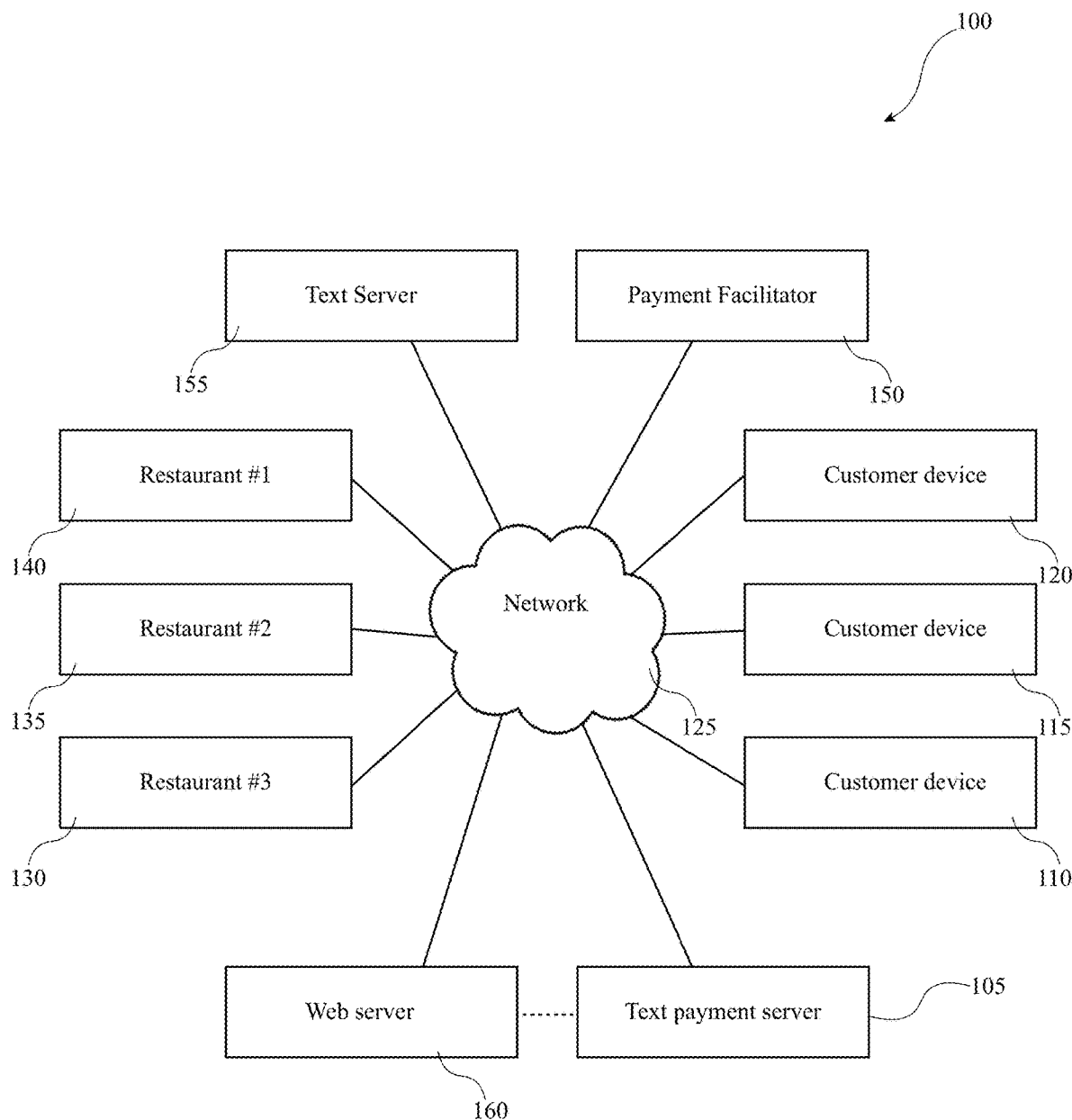
FIG. 1 is a block diagram of a text payment system according to some embodiments.

FIG. 1 is a block diagram of a text payment system 100 according to some embodiments. The text payment system 100 includes a number of devices in communication via network 125. The text payment system 100 may include various other components and/or fewer components than what is shown in FIG. 1.

The network 125 may include any type of communication network. In some embodiments, the network may include both a text message network and/or a computer network. In some embodiments, the text message network may provide communication between devices via SMS and/or MMS messaging.

In this example, the text payment system 100 may include three restaurants 130, 135, 140. While three restaurants are shown, any number of restaurants may be used. The restaurants 130, 135, 140 may, for example, may include one or more point of sale (restaurant POS) devices. A restaurant POS device may include computer system that may manage orders, create customer checks (or bill), process payments, etc. The restaurant POS device, for example, may take input from a waiter or waitress that includes the menu items ordered at a given table and produce a check (or bill). In some embodiments, the check may be associated with a specific table or order number.

In some embodiments, each restaurant may be associated with a restaurant identifier that may be used to distinguish one restaurant from another. In some embodiments, each restaurant or restaurant server, or restaurant POS may have a restaurant network address. In some embodiments, a server may be used in conjunction with two or more restaurants to store, organize, etc. restaurant bill data.

The restaurants 130, 135, 140 may be communicatively coupled with network 125. The restaurants 130, 135, 140, for example, may include various computer systems that may include one or more components of computational system 1300. The restaurants 130, 135, 140, for example, may include a point of sale (restaurant POS) device that can be used for any number of purposes such as, for example, organizing diners (customers) among tables, tracking orders, organizing a restaurant bill, facilitating payment with payment facilitator, etc.

In some embodiments, the text payment system 100 may include three customer devices 110, 115, 120. These customer devices may include any type of smart phone or tablet. Any number of customer devices may be used. The customer devices 110, 115, 120 may have applications, text messaging capabilities, and/or web browsing capabilities.

In some embodiments, the text payment system 100 may include a payment facilitator 150. The payment system, for example, may or may not be part of one or more restaurants. The payment system allows the restaurant 130, 145, 150 to process credit card payments and the like.

In some embodiments, the text payment system 100 may include a text server 155 (e.g., text message gateway). The text server 155 may include any device that can receive text messages from a mobile device (or any other device) and communicate text messages via network 125. The text server 155 may connect a phone network to the network 125. In some embodiments, the text server 155, for example, may include various computer systems that may include one or more components of computational system 1300. In some embodiments, the text server 155 may, for example, use one or more servers to host telephony infrastructure and provide connectivity between HTTP and the public switched telephone network (PSTN) through one or more APIs.

In some embodiments, the text payment system 100 may include a text payment server 105. In some embodiments, the text payment server 105 may execute any portion of each process and/or method described in this document. In some embodiments, the text payment server 105 may facilitate the payment of a check (or bill) in a restaurant via text messaging. In some embodiments, the text payment server 105 may be distributed across the Internet. In some embodiments, the text payment server 105 may include one or more components of computational system 1300 shown in FIG. 13.

In some embodiments, the text payment system 100 may include a web server 160. The web server 160 may provide web content in response to receiving a URL from a customer device 110, 115, 120. In some embodiments, the web server 160 may include a plurality of servers distributed across the internet. In some embodiments, the web server 160 may be communicatively coupled with the text payment server 105. In some embodiments, the web server 160 and the text payment server 105 may comprise a single server or server system.

In some embodiments, customer device 110, 115, 120 may include any type of computing device such as, for example, a tablet, smart phone, smartwatch, wearable device, laptop, etc. In some embodiments, the customer device 110, 115, 120 may be able to send or receive text messages via a text message network. In some embodiments, the customer device 110, 115, 120 may be able to access network content such as, for example, though a web browser. In some embodiments, the customer device 110, 115, 120 may include a first network interface and a second network interface. In some embodiments, the first network interface may include a text message network, a cellular network, a mobile phone network, or the Internet, etc. In some embodiments, the second network interface may include wireless router, such as, for example, a Wi-Fi interface. In some embodiments, the customer device 110, 115, 120 may be able to access two networks via a single network interface. For example, the customer device 110, 115, 120 may access the text message network through a wireless data network and access a webpage through the wireless data network.

In some embodiments, the customer device 110, 115, 120, for example, may include various computer systems that may include one or more components computational system 1300.

In some embodiments, network 125 may include the Internet, one or more wireless telephone networks, a text message network, a local area network, etc. or any combination thereof.

In some embodiments, text server 155 may send, receive, and/or route text messages between various devices connected with the network 125. For example, the text server 155 may send, receive, and/or route text messages between the customer devices 110, 115, and/or 120, and text payment server 105. In some embodiments, the text server 155 may send text messages and/or receive text messages using via a web service API. For example, text server 155 may include a service like Twilio, LinkTexting, etc.

The text server 155 may include a plurality of distributed servers. In some embodiments, a text message may include an SMS message, a text message, an MMS message, or any evolution thereof, etc.

In some embodiments, the payment facilitator 150 may include any credit card processing system. The payment facilitator 150 may process payments with payment services, such as, for example, MasterCard, VISA, American Express, PayPal, Google Wallet, Venmo, banks, etc.

Figure 2:
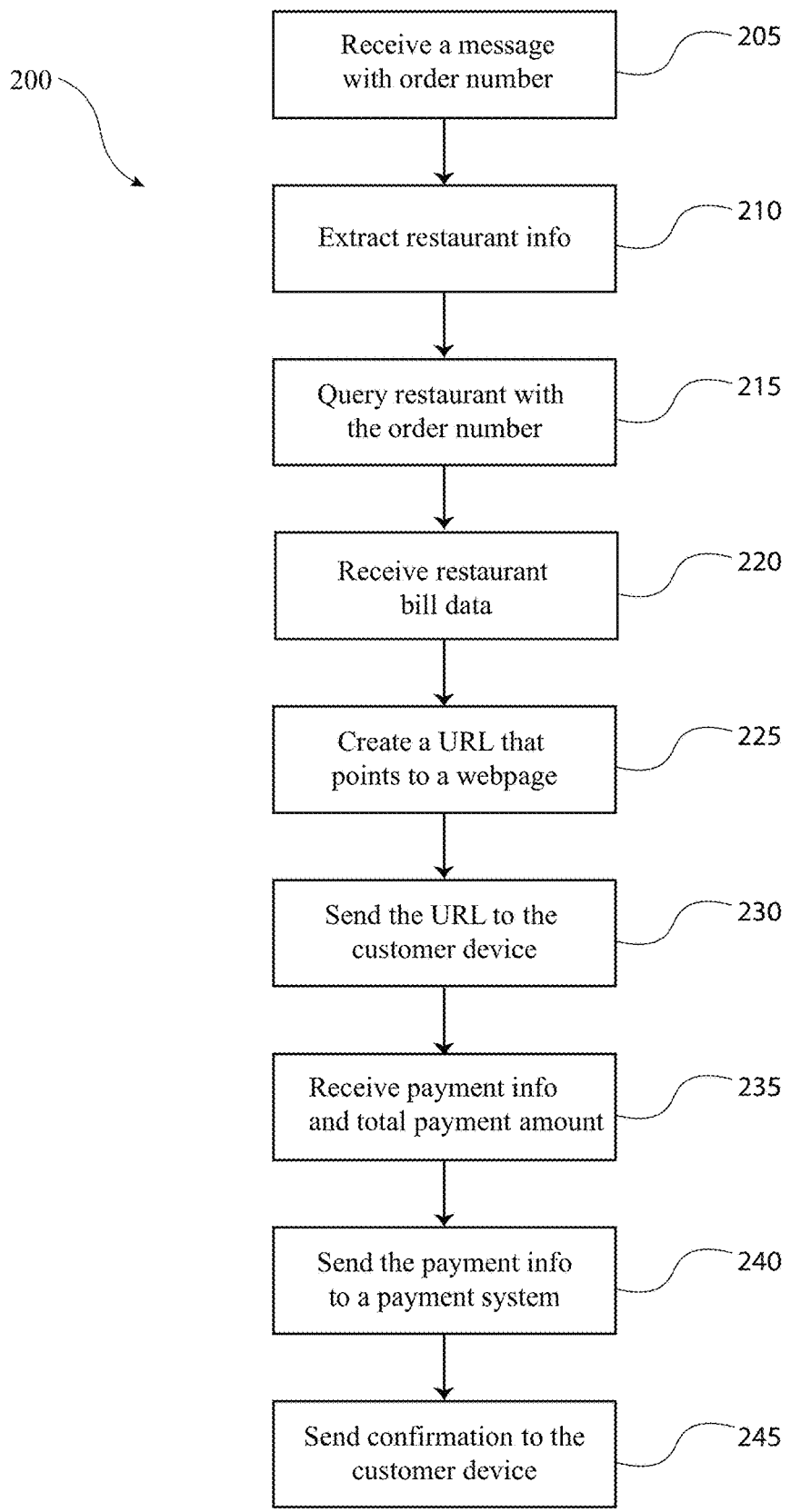
FIG. 2 is a flowchart of an example process for processing a restaurant check via text message, according to at least one embodiment.

FIG. 2 is a flowchart of an example process 200 for processing a restaurant check via text message, according to at least one embodiment. One or more steps of the process 200 may be implemented, in some embodiments, by one or more components of text payment system 100, such as text payment server 105. Although illustrated as discrete blocks, various blocks may be divided into additional blocks, combined into fewer blocks, or eliminated, depending on the desired implementation. Some blocks may occur at the same time, at different times, or in a different order.

Process 200 begins at block 205 where the text payment server 105 receives a message from a customer device (e.g., customer device 110, 115, or 120) via the network 125. The message may be received at least in part via a text message network (e.g., a mobile telephone network) and/or have been received at a third-party location (e.g., text server 155 or Twilio) as a text message. The message may be sent by the customer device as a text message from a customer phone number (e.g., the customer's phone number) to an MPS phone number associated with the restaurant) and/or may include a restaurant bill code. In some embodiments, MPS phone number could be a shortened phone number or short number.

For example, at block 205 a web request can be used by the text payment server 105 to the text server 155 (e.g., Twilio). In response, the text server 155 may send a message to the text payment server 105 that includes the MPS phone number, the customer phone number, and/or the order number.

Figure 4:
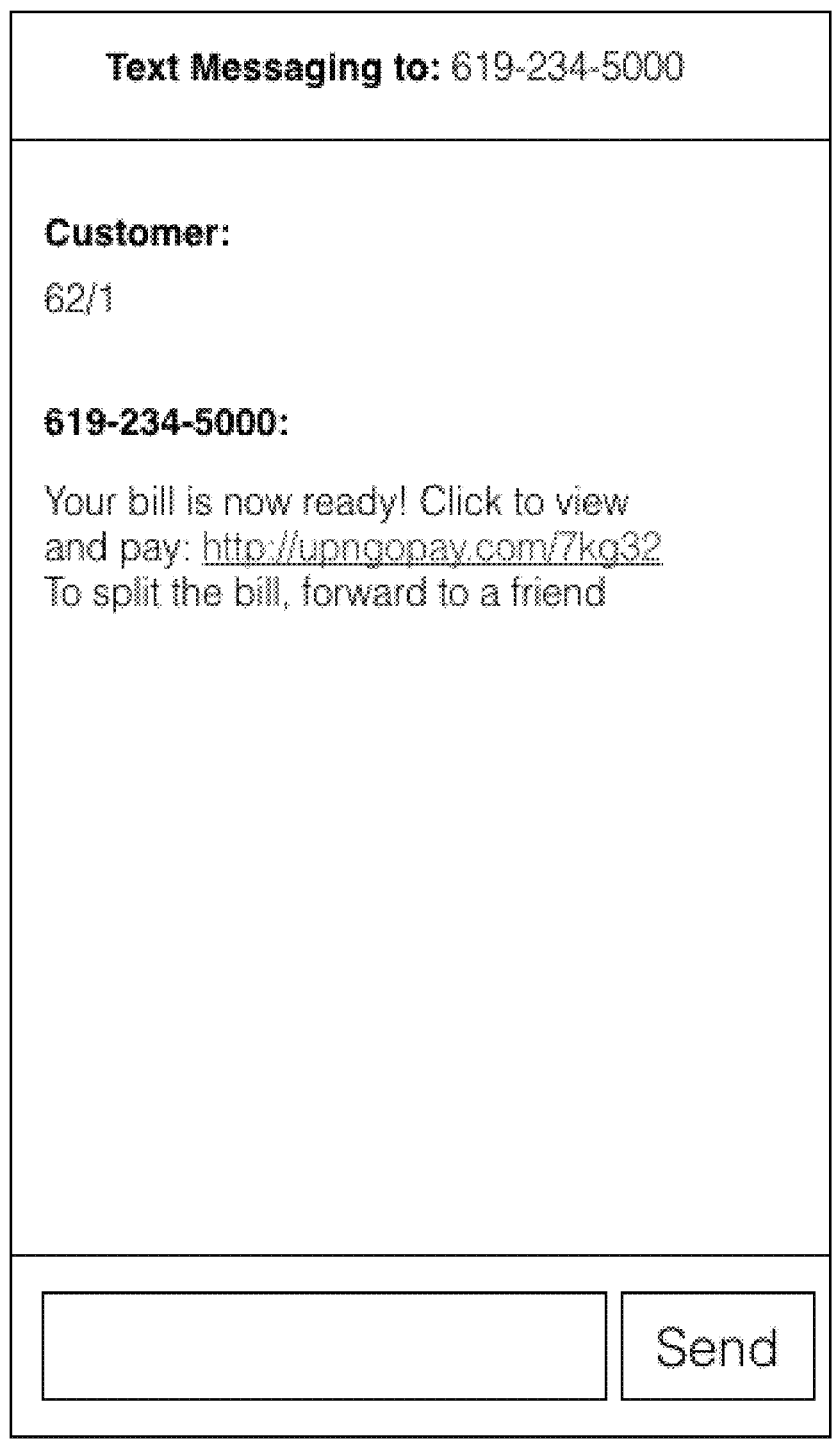
FIG. 4 is an example screenshot of a customer device interacting with mobile payment server according to some embodiments.

For example, a customer at a restaurant may receive a dinner bill (e.g., bill 300 shown in FIG. 3) that includes the MPS phone number (e.g., MPS phone number 310 shown in FIG. 3) and the restaurant bill code or code (e.g., code 305 shown in FIG. 3). The customer may send the restaurant bill code to the MPS phone number as a text message, for example, as shown in FIG. 4. The message may be routed by the text server 155 to the text payment server 105 via the network 125.

At block 210 the text payment server 105 may extract restaurant bill retrieval information address associated with the MPS phone number. The restaurant bill retrieval information may include a restaurant network address, a bill retrieval protocol, a bill retrieval API, API credentials, API keys, passcodes, passwords, login credentials, etc. associated with the restaurant associated with the MPS phone number. The restaurant bill retrieval information may be extracted from a database using the MPS phone number. For example, the text payment server 105 may have a database correlating restaurant bill retrieval information with an MPS phone number. Thus, a restaurant bill retrieval information can be found via the database using the MPS phone number to which the message was sent by the customer. For example, the text payment server 105 can look up the restaurant bill retrieval information in the database using the MPS phone number.

In some embodiments, the restaurant bill retrieval information in the database may be different for different restaurants and/or different restaurant POS systems used at restaurants. In some embodiments, the restaurant bill retrieval information may include an identifier or an API that can be used to interact with a restaurant associate with the MPS phone number. Any other connection credentials may also be included.

In some embodiments, the text payment server 105 may also lookup logo's, colors, names, images, addresses, styles, preferences, tax information, passcodes, passwords, APIs, communication protocols, etc. associated with the restaurant connected to the MPS phone number.

At block 215 a request may be sent via a second network for restaurant bill data for the restaurant associated with the MPS phone number using the restaurant bill retrieval information and the restaurant bill code. The query may be sent via a second network that may or may not be the same as the text message network (e.g., a second network). In some embodiments, the restaurant bill retrieval information may specify an API and/or API credentials that can be used to request restaurant bill data using the restaurant bill code.

In some embodiments, the restaurant computing system may, for example, include a computing system located at the restaurant (e.g., restaurant 130, 135, 140) and in communication with restaurant POS devices, and/or a server in communication with the restaurant computing system and/or restaurant POS devices. In some embodiments, the restaurant computing system may include any computing system that when queried with an order number at a specific restaurant network address can return a restaurant bill data.

In some embodiments, the restaurant computing system may include *Omnivore*, which can communicate with a plurality of restaurant point of sale devices, a restaurant server, etc. regardless of the point of sale device communication protocol.

At block 220 the restaurant bill data can be received at the text payment sever 105 via the network 125. The restaurant bill data, for example, may include at least one restaurant menu item purchased by the customer and a price for the at least one restaurant menu item. The restaurant bill data, for example, may also include a total amount due.

In some embodiments, communication between the text payment server 105 and the restaurant can occur using a third-party service such as, for example, *Omnivore*, that translates protocols, facilitates communication, and/or coordinates APIs with any number of restaurant Poss.

At block 225 the text payment server 105 may create a unique URL. In some embodiments, the unique URL can point to a unique webpage (or a series of webpages). The webpage, for example, may be created at block 225 or may it may be created when the URL is requested by a customer device. The unique URL, for example, when entered into a web browser (or any other application) may request a webpage (or a series of webpages) that when displayed on the customer device may include at least a portion of the restaurant bill data, a customer-interactive credit card payment field, and/or a signature field, these various fields may be on different webpages that can be accessed by the customer using the link. Various other data and/or fields may be presented as well as part of the webpage (or a series of webpages). In some embodiments, a tip field may also be presented such as, for example, as shown in FIG. 7 and FIG. 8

In some embodiments, the unique URL may include encoded data (e.g., order number, customer phone number, and/or restaurant information) that when sent to the text payment server 105 and/or the web server 160, the text payment server 105 and/or the web server 160 can lookup restaurant data, the restaurant bill data, the total amount, tax information, etc. and create a webpage that can display the restaurant data, the restaurant bill data, the total amount, tax information, etc. and/or allow the customer to pay the restaurant bill.

In some embodiments, the webpage can be created and stored in a database when the unique URL created. Then, when the unique URL is received at the text payment server 105 and/or the web server 160 the webpage can be retrieved from the database and sent to the customer device.

Figure 6:
FIG. 6 is an example screen shot of a tip payment webpage displayed on a customer device according to some embodiments.
Figure 7:
FIG. 7 is an example screen shot of a tip payment webpage displayed on a customer device according to some embodiments.
Figure 8:
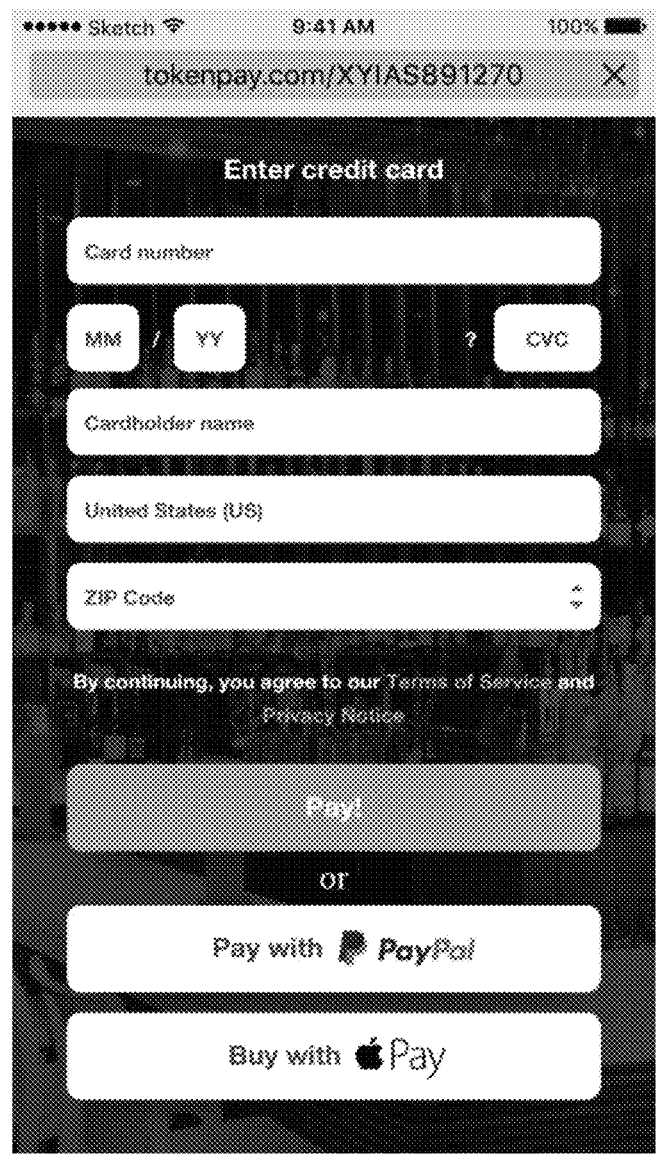
FIG. 8 is an example screen shot of a credit card payment webpage displayed on a customer device according to some embodiments.

In some embodiments, the webpage may include a webpage, code on a webpage, or a portion of webpage that may allow a customer to pay tip such as, for example, as shown in FIG. 6 and FIG. 7. Other elements, such as an instructional or informational message, could be included with the transmission of the URL.

At block 230 the unique URL may be sent to the customer device using the customer phone number via the text message network and/or text server 155. The URL, for example, may be sent in the body of the text message. In some embodiments, the URL may be shortened prior to sending, for example, using bit.ly, Hootsuite, Google, TinyURL, t.co, ow.ly, or another URL shortening service. In some embodiments, other elements, such as an instructional or informational message, could be included with the transmission of the URL.

In response to receiving the URL, the customer may select the URL and view the associated webpage that includes at least a portion of the restaurant bill data, a payment field (e.g., a customer-interactive credit card payment field or a field to enter data about another payment program), and/or a signature field, for example, as shown in FIG. 8. The customer, for example, may enter credit card information and submit the information. In some embodiments, the customer may also enter a signature via a touch screen. In some embodiments, the credit card information and/or the signature data may be transmitted to the text payment server 105.

Figure 5:
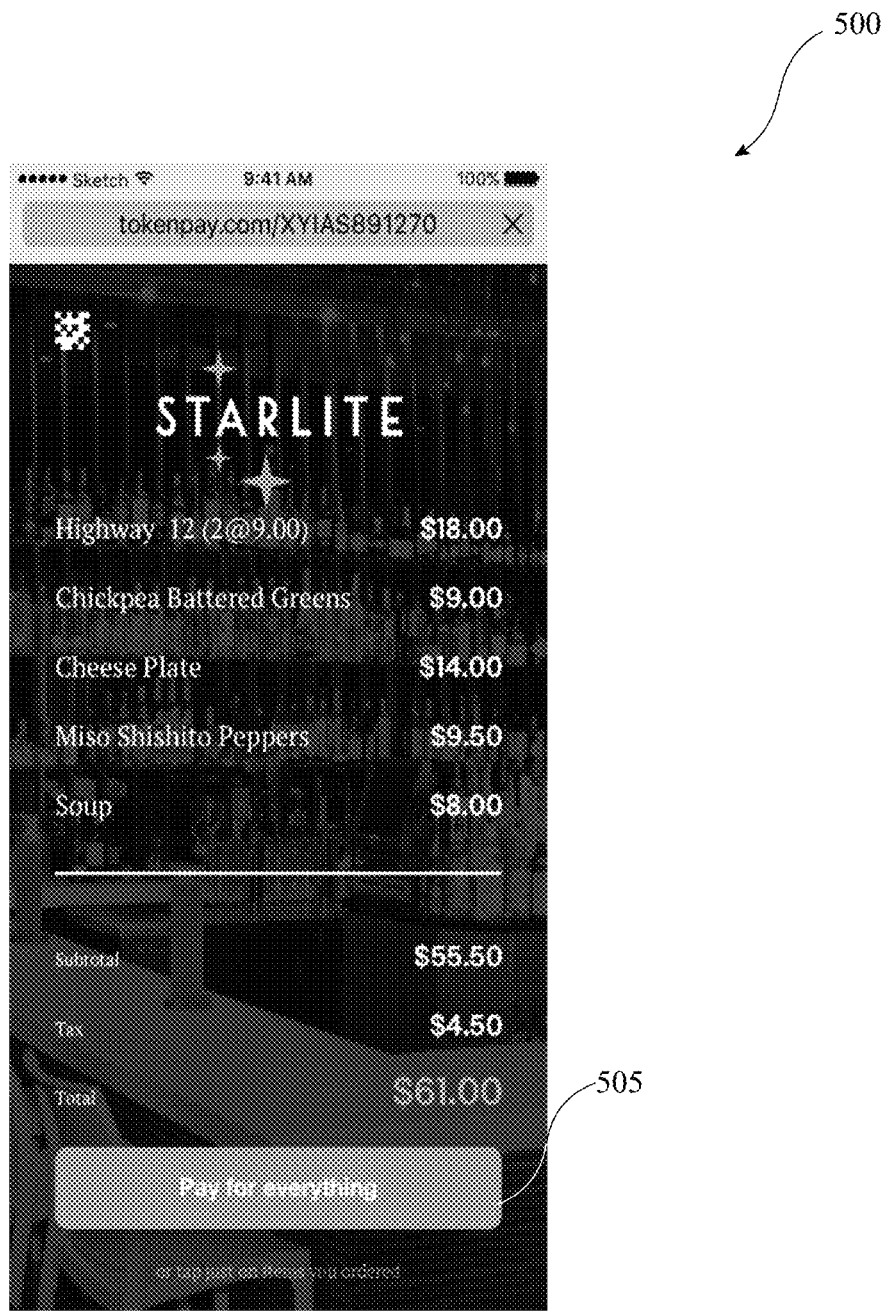
FIG. 5 is an example screen shot of a digital restaurant bill displayed on a customer device according to some embodiments.

In some embodiments, the webpage may include multiple webpages. For example, as shown in FIG. 5, a first webpage 500 may show a summary of the menu items ordered by the customer and/or the customers party. The web page may also include a button 505 that can be selected to pay the bill.

In some embodiments, at block 235 the credit card information may be received at the text payment server 105 from the customer device via the second network. In some embodiments, the credit card information may be encrypted. In some embodiments, the text payment server 105 may receive a total amount paid and/or a tip amount.

In some embodiments, the text payment server 105 may also receive a photograph of the customer from the customer device. In some embodiments, the text payment server 105 may also receive an image of a signature entered by the customer at the customer device. In some embodiments, the text payment server 105 may also receive geolocation data from the customer device.

In some embodiments, total amount paid received at block 235 may be less than the total amount of the restaurant bill. For instance, the customer may pay only a portion of the bill such as, for example, only for the items consumed by the customer. In some embodiments, other customers may pay for portions of the bill.

At block 240, the credit card information, the tip amount, and/or a total amount paid, may be sent to either the payment facilitator via the network for settlement and/or payment, or the restaurant (e.g., the restaurant computing system or restaurant POS) via the network for processing through the restaurant's payment system. In some embodiments, other data may also be sent such as, for example, the image of the signature, the photograph of the customer, the geolocation data, etc.

In some embodiments, the text payment server 105 may send a confirmation code or a receipt to the customer via the text message network or via any other networks. In some embodiments, the verification code may be entered into the webpage by the customer on the customer device prior to completing the transaction.

In some embodiments, the text payment server 105 may send the signature data, and/or the customer phone number, etc. to the restaurant. In some embodiments, the text payment server 105 may save the signature data, the customer phone number, and/or the restaurant bill code, etc. in a database.

In some embodiments, the webpage may be created by the text payment server 105 to request geolocation data from the customer device. The received geolocation data may be sent by the customer device to the text payment server 105 via network 125 (e.g., either via the text message network, or another network). In some embodiments, the geolocation data may be required after certain time of night, at certain restaurant or type of restaurant, etc.

In some embodiments, the webpage may be created by the text payment server 105 to request a photograph of the customer via a camera on the customer device. The received photograph may be sent by the customer device to the text payment server 105. In some embodiments, the photograph data may be required after certain time of night, at certain restaurant or type of restaurant, etc.

In some embodiments, at block 245 a payment confirmation code, confirmation information, or some related confirmation code can be sent to the customer via any network.

In some embodiments, the confirmation code or information can include instructions to the customer to write the code on the physical check (or whatever) and give it back to the restaurant on their way out so the restaurant can have confirmation of payment.

In some embodiments, a notification can be sent to a restaurant server, a restaurant POS, a restaurant device, a token device, etc. that can indicate that all or a part of a payment has been made to a specific order.

In some embodiments, the unique URL may be created (e.g., at block 225) and/or sent to the customer device (e.g., at block 230) prior to or in parallel with blocks 210, 215, and/or 220. In some embodiments, the URL may include information related to the order number and/or restaurant information (e.g., a restaurant identifier). In response to receiving the URL, the order can be retrieved from the restaurant using the order number and/or the restaurant information from the URL. A webpage displaying the order can be created and displayed on the customer device.

Figure 9:
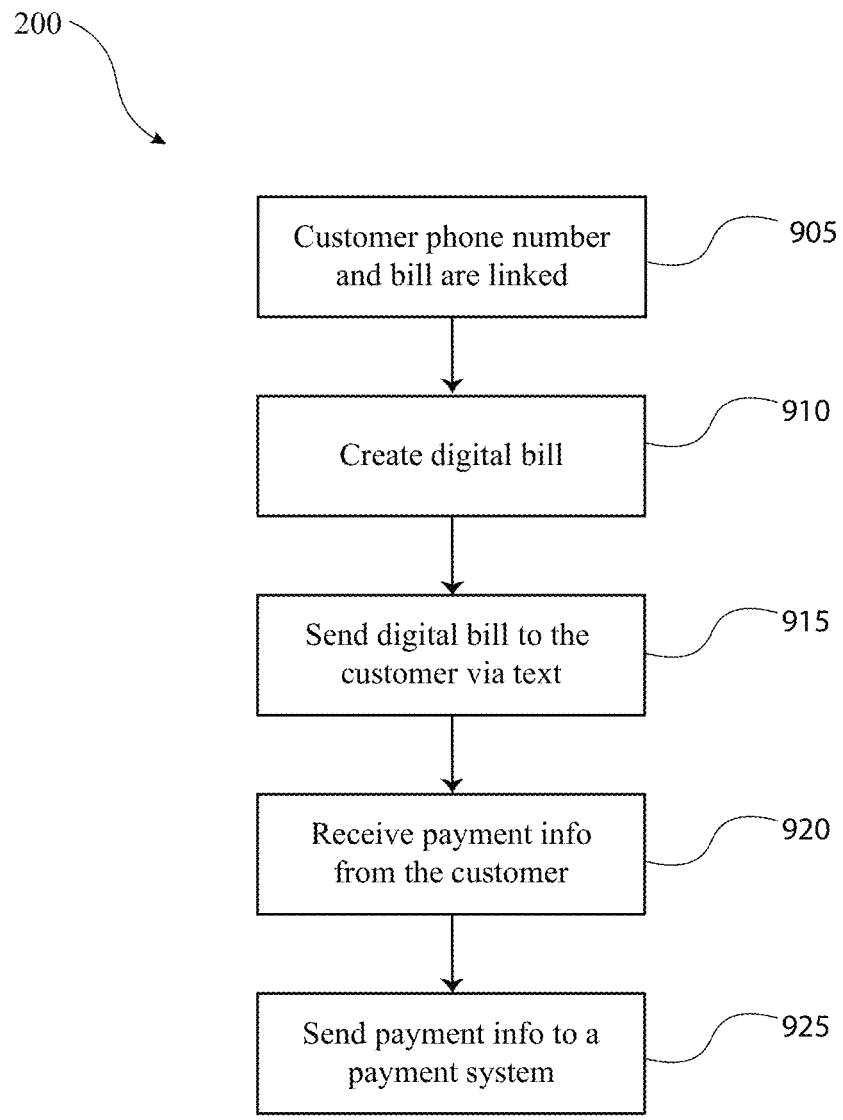
FIG. 9 is a flowchart of an example process for processing a restaurant check via text message according to at least one embodiment.

FIG. 9 is a flowchart of an example process 900 for processing a restaurant check via text message according to at least one embodiment. One or more steps of the process 200 may be implemented, in some embodiments, by one or more components of text payment system 100, such as text payment server 105. Although illustrated as discrete blocks, various blocks may be divided into additional blocks, combined into fewer blocks, or eliminated, depending on the desired implementation.

Process 900 may begin at block 905 where a customer phone number and a bill are linked together. This linking can occur in any number of ways. For example, a customer can text a code (or a bill number, restaurant bill code, receipt number, etc.) to an MPS phone number. Using knowledge of the MPS phone number where the code was sent and caller ID of the customer phone from where the code was sent, the customer phone number and the code can then be linked. As another example, the phone number can be received from a customer when making a reservation, requesting a table, signing up for a loyalty program, etc. When the waiter creates the bill, the customer phone number can be automatically linked with the bill. As another example, the customer phone number can be entered into an app associated with the restaurant and linked with the bill through a server in communication with the app.

At block 910 a digital bill can be created. The digital bill may be created at a web server or other server and may include menu items ordered, a price for the ordered menu items, and/or a total price. The digital bill may be created to be presented via a web browser or an app executing on a mobile device. The digital bill may, for example, by created using a markup language (e.g., HTML, XML, etc.). The digital bill may also include options for a customer to include a tip, provide a comment, make a social media post, rate the restaurant, etc.

At block 915, a link to the digital bill may be texted to the customer using the customer phone number. The link may include a URL that may be used to retrieve the digital bill when selected by the customer. In some embodiments, the digital bill may be created such as, for example, in block 910, in response to receiving a request for the webpage associated with the link to the digital bill. The link may include information referencing the order number and the restaurant so that the digital bill may be created in response to the request from the customer device.

At block 920, payment information may be received via a web browser or an application executing the customer mobile device. In some embodiments, the payment information may include a payment amount and/or a tip amount. The payment information, for example, may be encrypted. In some embodiments, the payment information may include geolocation data from the customer mobile device. In some embodiments, the payment information may include a signature from the customer entered through the customer mobile device.

At block 925 the payment information may be sent to a payment processor for settlement. The payment processor may include the restaurant payment processor. If the restaurant is not used as the payment processor, then after confirmation of that the payment has been settled, a message may be sent to the restaurant. In some embodiments, the customer may be sent a receipt.

Figure 10:
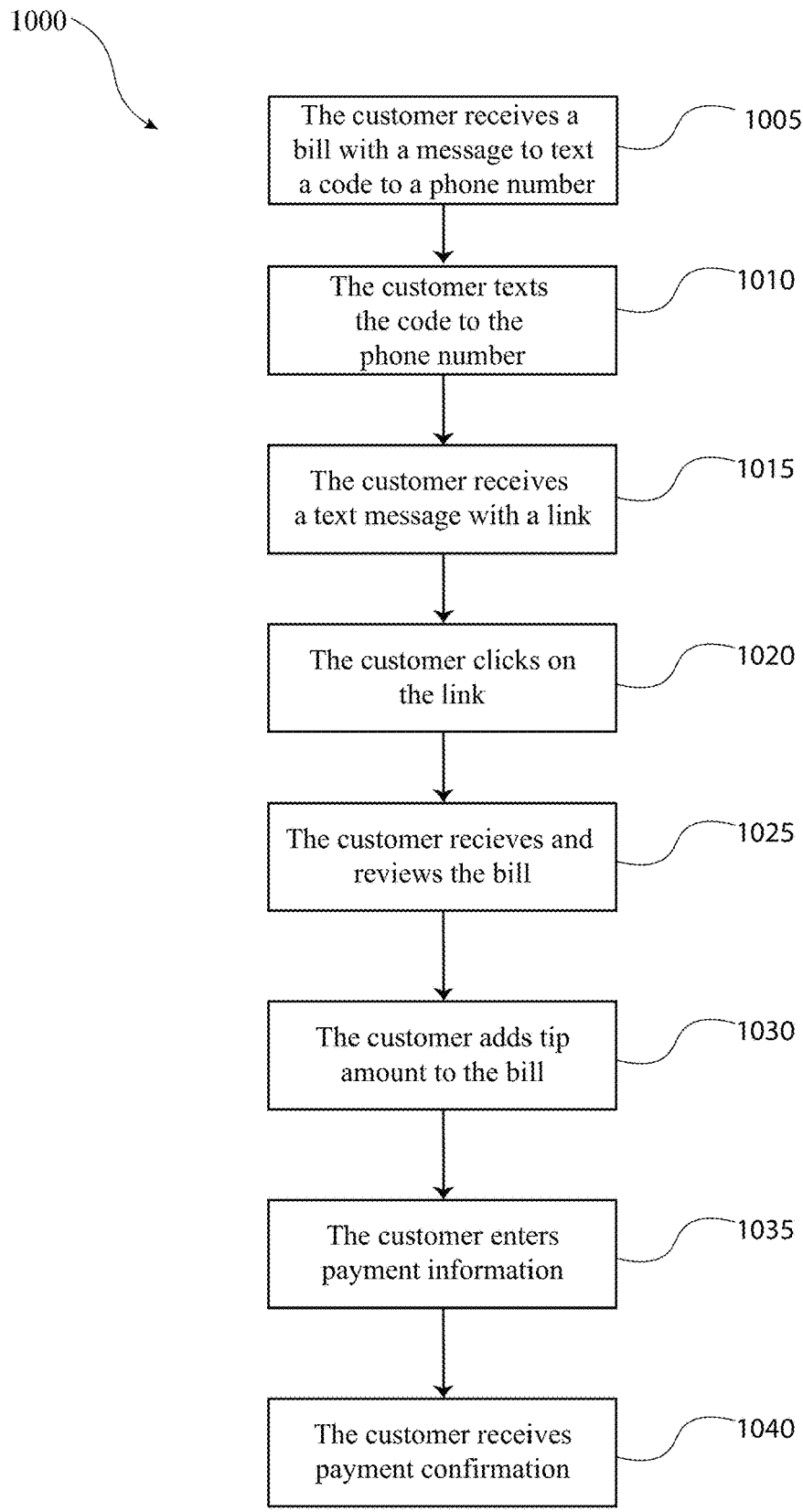
FIG. 10 is a flowchart of an example process that may be followed by a customer interacting with a text payment system according to some embodiments.

FIG. 10 is a flowchart of an example process 1000 that may be followed by a customer interacting with a text payment system according to some embodiments. One or more steps of the process 1000 may be implemented, in some embodiments, by a customer using, for example, a customer device 110, 115, and/or 115. Although illustrated as discrete blocks, various blocks may be divided into additional blocks, combined into fewer blocks, or eliminated, depending on the desired implementation. Some blocks may occur at the same time or in different order.

Process 1000 begins at block 1005 where a customer receives a restaurant bill with message to text a code to an MPS phone number.

At block 1010 the customer texts the code to the MPS phone number. In response, at block 1015, the customer receives a text message with a link. If the customer clicks the link, at block 1020 a digital bill is presented. At block 1025, the customer can view the digital bill.

At block 1030, the customer can elect to pay the digital bill and may enter tip information. In some embodiments, the customer can enter an amount to pay, enter a percentage of the digital bill to pay, enter a number of guests among whom to equally split bill, select items to pay for, possibly choosing a portion of each selected item to pay for, etc. The customer may then see an adjusted amount due for part of the bill selected. The customer, for example, may also add a tip to the digital bill as shown in FIG. 6 and FIG. 7.

At block 1035, the customer may provide payment information (e.g., credit card details, money transfer credentials, etc.). This can be done, for example, using the webpage shown in FIG. 8. Once the payment information has been entered, the total payment amount and/or the payment information may be sent to the text payment server 105.

At block 1040, the customer may receive confirmation that the bill was paid and may feel free to leave the restaurant.

In some embodiments, after the customer pays the restaurant bill the customer may be presented with a webpage where the customer can provide a review of the restaurant. For example, the customer may be presented with a webpage where the restaurant service may be reviewed and/or ranked on a scale. If the customer ranks the restaurant service above a predetermined amount on the scale, the ranking may be sent to a third-party restaurant reviewing service such as, for example, OpenTable, Yelp, etc. if the customer ranks the restaurant service below a predetermine amount on the scale (e.g., the same or different predetermined amount), the ranking and review may be sent to a given email address such as, for example, the email address of the manager or owner of the restaurant.

Various other embodiments are also disclosed for facilitating payment of a restaurant bill using a text messaging service. Some embodiments facilitate the payment of a restaurant bill using a token device, other embodiments facilitate the payment of a restaurant bill without using a token device. Some of these embodiments are disclosed below. These embodiments are not meant to limit the scope of other embodiments. The concepts in the various embodiments may be combined in any fashion.

In some embodiments, a customer may be matched to the tab (or check) they wish to pay. For example, a restaurant point of sale (restaurant POS) may print an instructional message on each check printed from the restaurant POS. For example, the instructional message may include a phone number, a code, and instructions to text the code (or restaurant bill code) to an MPS phone number. The message might say, for example: "Text 1234 to 555-555-5555 to pay by phone." In this example, 1234 is the code and 555-555-5555 is the MPS phone number.

The code, for example, may help identify the check. In some embodiments, the code may be the restaurant bill code assigned to the tab by the restaurant POS. In some embodiments, for example, within a certain timeframe, a restaurant POS does not assign the same restaurant bill code to more than one tab, thus the restaurant bill code generally uniquely identifies a tab. The restaurant bill code doesn't have to be a number; it could be any type of identifier, e.g. one containing letters, symbols, computer-readable data, etc.

In some embodiments, the code is texted to the MPS phone number by the customer device. The code can then be received by a messaging gateway (e.g., text server 155), e.g. a system serving as an interface between the phone network and the network 125, such as Twilio, which routes the message, along with metadata such as the MPS phone number used, the customer phone number, and/or a timestamp, to the text payment server 105. The MPS phone number may be a phone number dedicated to a given restaurant or chain of restaurants. The text payment server 105 may know that any code sent to that number represents a check at that restaurant.

In some embodiments, the customer phone number may be logged by the MPS and associated with the check referenced by the code.

In some embodiments, the text payment server 105 can identify from the MPS phone number used and the code sent which check at which restaurant is being queried. The text payment server 105 may include a database that correlates a specific MPS phone number with a specific restaurant. Thus, the text payment server 105 can associate a specific tab at a specific restaurant with a specific customer phone number and thus match a tab to a customer.

In some embodiments, the text payment server 105 may communicate with a restaurant POS, either directly or via one or more intermediaries (e.g., Omnivore), and interacts with and requests the data for the given tab associated with the code. This query may occur over the Internet and/or other interfaces, such as local wireless or wired networks or other communication interfaces of any kind.

If the code was not originally the restaurant bill code, then the text payment server 105 may translate the code to the restaurant bill code. In some embodiments, the code can be translated, using any techniques or third party services, into an identifier that can identify the tab via the restaurant POS or any system connected with or representative of it.

In some embodiments, the text payment server 105 may query the restaurant POS for the tab with an identifier that can be recognized by the restaurant POS, e.g. the restaurant bill code.

In some embodiments, the text payment server 105 may ask the restaurant POS to generate the check. In some embodiments, this may occur by converting the tab to a check and/or closing the tab. This may include different activities and/or functions that may or may not be specific to various restaurant POS.

In some embodiments, the text payment server 105, through the restaurant POS or another channel, may send or otherwise make a message or indication available to the server or other restaurant employee that the check generation is requested and give the server an opportunity to review the tab or check for accuracy, e.g. by adding, adjusting, removing, etc. any necessary items. Sometimes items ordered are not added to the tab until the check is requested.

In some embodiments, the message indication could be a light that flashes, it could be an indicator within the restaurant POS, e.g. a color change, flash or other animation that occurs on a restaurant POS screen, for example an item or image that represents a table. In some embodiments, it could be a text or other message or communication that gets sent to a server or another restaurant employee, for example via a mobile device such as a phone, pager, or another electronic device, etc.

In some embodiments, the restaurant bill data may be sent from the restaurant POS to the text payment server 105. The data may include part or all of what is seen on a printed check and more. This includes itemization of what was ordered, pricing, tax, server name or other identifier, date and timestamps, etc. In some embodiments, the text payment server 105 may store this data and any associated data in one or more databases.

In some embodiments, the text payment server 105 may use the restaurant bill data in its database and generates an HTML view of the check. In some embodiments, the HTML view of the check may include custom styling or branding, e.g. the MPS may automatically match and format a background image and/or logo from the restaurant and/or other items to the check view. In some embodiments, the HTML check view may comprise a webpage, microsite, or web app, or portion thereof, that offers several functionalities, pages, and/or views to the customer. This may be referred to as a "microsite." The check microsite may be responsive so that its layout automatically adjusts to optimize the view on a given screen size.

In some embodiments, the text payment server 105 may adjust the check. For example, additional fees may be added to the check, such as a convenience fee. The Restaurant POS, text payment server 105, server, or other entity can add this fee or it can be automatically added by one entity and routed to other entities as needed. For example, the text payment server 105 could automatically add a convenience fee to the check and recalculate the total accordingly. The text payment server 105 may or may not relay this modification back to the Restaurant POS.

In some embodiments, a URL or link is generated that links to the specific check view on the check microsite.

In some embodiments, the link to the check microsite may be sent to the customer phone number via text messaging, or a similar messaging service via a gateway such as a third-party service, for example, Twilio or a similar service. For example, a message may be included with the link, e.g. "Click to pay your bill:" followed by the link. For example, the link may be unique to that check and can be shared with other customers, for example by forwarding or otherwise sharing or transmitting the text message to another person. Whomever has the link can access the same check microsite and fully utilize its functionality. This allows multiple people to pay for all or portions of the check.

In some embodiments, the customer can click the link on the customer device. As a result, a browser on the customer device may load the URL, thereby requesting from the web server 160 the check presentation on the check microsite.

In some embodiments, the formatted check, for example, in the form of the check view of the check microsite may be displayed on the customer device. This view, for example, may represent an entry point and/or portion of the check microsite. The customer may view details of their check on this view.

In some embodiments, the customer may optionally split the check with other customers. For example, each customer may open the check view, then tap on graphical representation of an item that they ordered or wish to pay for. If a customer wants to pay for a portion of an item, for example, he or she can specify how much of it they want to pay either by percentage or dollar amount. A customer could also, for example, elect to pay a percentage of the entire check, a sub portion of the check, or any dollar amount.

In some embodiments, a customer could tag items on a bill with identifiers of other people. For example, one customer could tag some items with the name of another customer that ate or is going to pay for them. This could trigger a message to the tagged person with a link to the check microsite and the total cost of items tagged with their identifier calculated and presented.

In some embodiments, the customer could tag people or items to be displayed on social media. For example, information, for example, any type of media about the tagged person, item, check, restaurant, etc. may be transmitted to a social network or any other network or system. For example, if a customer is tagged to an entry on a check, a post may be generated to their Facebook page indicating the entrée they ate.

In some embodiments, the text payment server 105, via the check microsite, or in coordination and communication with the Restaurant POS, dynamically calculates, or recalculates, the total of the portions of the of check the customer wishes to pay, adding proportional amounts of the appropriate taxes, other surcharges, etc. If there is a convenience fee added by the text payment server 105, for example, that can be added to each portion or prorated among the total portions, or calculated and applied according to any other algorithm.

In some embodiments, once a total has been calculated including any potential taxes or other charges, the customer may select an amount of tip. In some embodiments, a separate webpage may be provided to the customer to enter a tip amount as shown in FIG. 6 and FIG. 7. The customer might, for example, slide a dot across a bar to choose the percentage and amount of tip that they wish to add. This gets added to the payment amount due for the customer.

In some embodiments, the check view offers different options for paying the bill, e.g. mechanisms to split the bill with another payer if desired (see above), object to items on the bill, etc. In some embodiments, the check microsite offers the ability to select or provide a payment method. The payment method could include credit card information.

The payment method could include a credit card; a credit card number and associated information that may be required for processing, a representative of a credit card, its number or other data, such as a tokenization of it possibly by a service like Apple Pay, Google Pay, or Samsung Pay; an online or mobile payment service such as PayPal, Venmo, etc., or any other form of payment, for example cash or check.

In some embodiments, the customer could supply their credit card number, expiration date, security code and any other needed details about their payment method. The customer could enter all or part of the information into their phone manually. The browser on their customer device, or other hardware or software of their phone may have stored some of this information and may apply it for the customer. Software in the browser or on the customer device may use the camera to visually view the card and obtain information on the card via optical character recognition or other. The phone may have hardware available that can read the card's magnetic stripe, RFID chip, or any other interface.

In some embodiments, the check microsite could forward the payment details to a payment gateway, possibly via the Restaurant POS, and obtain an approval for the payment. The payment could be deposited to the restaurant's account, or to the text payment server 105 account and then forwarded to the restaurant, potentially minus any charges applied by the text payment server 105, which may be to the benefit of a customer or other entity.

In some embodiments, when payment has been approved for the entirety of the check, meaning multiple portions of the check if multiple customers have split the check, then the MPS could forward to the restaurant POS sufficient information to mark the check as paid. This may close the order and free the associated table or seating for new guests.

In some embodiments, additional services may be provided after an initial transaction. For example, the customer could be prompted to provide optional feedback. Feedback could be a rating, a comment, and/or any combination of those and other items. Feedback could be routed to one or more sources, for example the restaurant manager, a person associated with the text payment server 105, a third party, e.g. a service that tracks and presents ratings. In some embodiments, the customer could be queried if they would like to receive additional offers from the restaurant. One additional offer may trigger a future text to the customer letting them know that they may receive a discount, possibly if they purchase an item like they have ordered before. In some embodiments, all data is stored and may be analyzed, shared, and/or used to provide any other service.

Any of the proceeding or following steps, devices, processes, systems, actors, businesses, locations, people, customers, servers, employees, owners, relationships, identifiers, other people, places, ideas, processes, concepts, or things, etc. can be omitted, rearranged, reordered, replaced, adjusted, refined, forked, integrated with anything else, augmented, incorporated into other actions, systems, devices, etc. Any variations of any kind can be made.

In some embodiments, for a customer to pay by phone, the tab may be identified and matched to the customer, such that it is known which tab is theirs or which tab they desire to pay in part or full.

There are multiple mechanisms that can be used to match the check to the customer.

For example, Check Identifying Information (CII) can be added to a check. For example, CII can be sent to the text payment server 105. The text payment server 105 can identify the check to be paid in full or part by the given customer. The CII, for example, can include one or more of a code, a check number, an order number, a restaurant bill code, a date, a timestamp, a phone number, a table number, a seat number, a tray number, a container number, a computer readable image or data, a QR code, an RFID tag, a magnetic stripe, an iBeacon or other wireless broadcast, or other and/or anything else that can identify that check.

For example, CII could be provided on some other medium or in some other way. For example, the CII could be printed on a piece of paper, a card, or some other material or item and made available to customers. It could be handed to customers, it could be on a table, a chair, on any item that is on, connected to, related to, near, or in any way associated with a table or chair, or items ordered. It could be on a combination of things and/or conveyed in a combination or multiple ways. The CII could also be conveyed verbally or visually, for example on a screen or spoken. It could be conveyed in full or part via other senses, e.g. tactile, smell, etc.

In some embodiments, the Customer Phone Number could be associated with the check, (e.g. the match could be facilitated from the opposite direction).

For example, a host, server, or other person could obtain at least one Customer Phone Number and enter it or them into a restaurant POS or connected system at the restaurant. The restaurant POS could send the Customer Phone Number to the text payment server 105. For example, the restaurant POS could make the customer phone number, or multiple customer phone numbers associated with a check available to the text payment server 105. The text payment server 105 would then know which check that customer likely wants to pay when a text message is received from the Customer Phone Number. The text payment server 105 could send a unique URL or link with restaurant bill data (or different versions or views of the same check) to the Customer Phone Number(s) so it would be known when each link is clicked, which phone number is viewing that check.

As another example, one or more customer phone numbers could be determined automatically and entered or provided to a restaurant POS, text payment server 105, text payment server intermediary, or another system. For example, a reservation or seating service, e.g. OpenTable or Yelp Reservations, can relay one or all of the customers' phone numbers (or other identifying information to the restaurant POS, text payment server 105, or to a service that can get that information ultimately to the restaurant POS or the text payment server 105.

As another example, a match could happen by proximity, e.g. a phone or other device associated or representing a customer, such as a smart watch, Fitbit, TOT device, electronics embedded into clothing or a human or other body, etc. transmits its number or another identifier to another device. The transmission could be triggered by location or proximity, e.g. a customer phone passing a nearby device, such as a host or server's phone, tablet, or other device. That device or something connected or associated with it could send the phone number or identifier to a system, such as a restaurant POS or MPS, where it could be combined or associated with, or sent or made available to somewhere or system where it can be combined or associated with, a check, table, order or other number or other identifier that can lead to the ultimate association of those one or more phone numbers with the checks they may wish to pay.

For example, the match could also happen via location detection. For example, if the location of a table is known and the location of a phone is known, it could be determined that the customer with a given phone wants to pay the tab associated with the nearest table. Location can be determined by indoor or outdoor positioning systems.

For example, match could also be made manually. For example, the customer could be shown a list of open checks and select the one that looks correct. This process could be refined by the service asking the customer questions to narrow down which check is theirs. For example, the service could ask the customer if they ordered certain items, then this could narrow down the list of possible open check for them to select from among. Timing, such as comparing times of day of various events, could also be used to narrow down options.

As another example, indoor positioning could similarly narrow down possible checks to match. For example, an indoor wireless positioning technology could know the coordinates of a table. The coordinates of the phone could be similarly or otherwise determined. For example, if a phone has coordinates that are close to two or more tables and each table has an open check, then the customer could be prompted to pick their check from among the options. For bill splitting purposes, if two phones have the coordinates of a table, they could both be prompted the same check, or to choose from among checks that include the check they likely want to pay.

As another example, tables or orders could be numbered or have other form of identification and these numbers or other forms of identification could be made available to customers, for example table or order numbers or other forms of table identification could be displayed on the table, a handout, or the server could convey the table number, for example verbally or written or on an item that is shared like a table flag. Checks are typically associated with tables; therefore, a customer could provide a table or order number to the system.

As another example, a customer could order from their phone or other electronic device, in which case the phone could calculate the items and amounts due on its own and/or in communication with the restaurant POS.

As another example, a device could exist on the table, be handed to the customer, or otherwise be made available to the customer that can facilitate a connection. For example, the customer could press a button on an electronics device or interface their phone with an electronics device on or associated with the table, the order, an order flag, etc. that could ultimately be used to make the linkage between the customer and the order, table, check, etc.

As another example, a QR code or other computer-readable code could be on a table (or other item, such as an item handed to the customer, an item on the table, e.g. a candle light, salt or pepper shaker, etc., on a menu, etc. that a customer could scan with their phone that can be sent to the MPS to identify the table and restaurant, as well as the restaurant bill code, seat number, etc. and then that information can be used to query the restaurant POS for restaurant bill data.

In some embodiments, a message could be generated by the restaurant POS, text payment server 105, and/or one or more intermediary services to be presented to the customer. The message could be printed on a paper check, another paper, or any other item.

In some embodiments, a code could be a number or alphanumeric string of any kind. The code could also be pre-existing numbers, e.g. the code could be the restaurant bill code of the tab, the table number, an identifier, description, or reference of or to one or more customers, a description of a customer, e.g. "man in grey sweater," etc.

In some embodiments, codes could be automatically generated based on any algorithm. Codes could be unique to a restaurant, unique to the system, unique to a restaurant per day or other time period, unique until a tab is paid and a certain amount of time or other events have passed or not. In some embodiments, the code could be imbedded in the phone number, i.e. the number texted carries unique information to identify the tab. In some embodiments, the code may be unique to the tab represented by that check, or otherwise, possibly in conjunction with the phone number and/or other details like time, day, location, etc. identifies that bill. In some embodiments, the code could be generated by any person or system. For example, the restaurant POS could generate the code, a person could enter and/or assign a code, the text payment server 105 or some other computer, software, or system, could provide the code, possibly via a communications interface of any type.

In some embodiments, a code could change at any time and changes could be propagated among appropriate systems, e.g. the restaurant POS and/or text payment server 105. In some embodiments, codes could have sub codes, e.g. Table Number/Order Number. This or something like it could be used to keep track of different orders at the same table, among the same people, with different payers, or any other organization of people, items, payment terms, accounts, etc.

In some embodiments, a code could be a number that is unique to each check on an MPS, or multiple MPS. A code could be two or more codes appended or mixed according to any algorithm. A code could be a restaurant identifier combined with an order identifier and/or a table identifier and/or any other identifier.

In some embodiments, there may be one or more MPS phone numbers associated with text payment server 105. An MPS phone number could be established for each restaurant, a combination of restaurants, a section of a restaurant, the entirety of restaurants in a chain of restaurants on the system, each bill, a collection of bills, any imaginable combination, or not, etc. The MPS phone number a customer texts may be known as an Inbound MPS Phone Number.

In some embodiments, all MPS customers might text the same number, or multiple numbers may exist for different reasons or subsets, e.g. one number for a group or chain of restaurants, one number for a region, etc. It's also possible to have a different number for each tab. In this case, the content of the message sent can be anything, because the number texted identifies the tab.

In some embodiments, there may be one or more MPS phone numbers. An MPS phone number could be established for each restaurant, a combination of restaurants, a section of a restaurant, the entirety of restaurants on the system, each bill, a collection of bills, any imaginable combination, or not, etc. The MPS phone number a customer texts may be known as an Inbound MPS Phone Number.

In some embodiments, it is also possible that MPS Phone Numbers could change dynamically, potentially according to an algorithm. For example, a set of phone numbers could be used in some sequence or according to some criteria for different checks. As one example, one or more digits in the phone number could match, or otherwise relate or reference to one or more digits or other pieces of data in the check. The MPS phone number(s) could change based on time, date, geography, amounts due, etc.

In some embodiments, a communication could be received at one MPS phone number and a reply sent to the customer from the same or a different MPS phone number. The MPS Phone Number sending messages may be known as the Outbound MPS Phone Number. The Outbound MPS number may follow similar logic in its determination or assignment as the Inbound MPS Phone Number. While communication with one customer about one check will generally occur with the same Inbound and Outbound MPS phone number, it is possible for any sequence of equal or different MPS phone numbers to be used as Inbound and Outbound numbers with the same customer, customers paying the same check, or anyone else.

In some embodiments, the customer may use a phone to send and receive texts with an MPS phone number. The phone could be a smartphone, e.g. one running iOS, Android, Windows, BlackBerry, etc.; a feature phone; another type of phone; a tablet; a computer; a computing device; or any other communications device.

In some embodiments, instead of an MPS Phone Number, any other communications channel could be used, in place of both, or either, of the Inbound MPS Phone Number and Outbound MPS Phone Number. For example, email may be used, messenger services (for example Facebook Messenger, Apple iMessage or Messages, Google Hangouts, WhatsApp, etc.) may be used, social networking services may be used (for example Twitter, Instagram utilizing customer names, hashtags, mentions, hash tagging, private messages, etc.), etc.

In some embodiments, the Customer Phone Number is the phone number, or other identifier, of the device or account that is used to text an MPS Phone Number. Generally, if a customer uses their smartphone to text an MPS phone number, the phone number of their smartphone is the Customer Phone Number. There could be more than one Customer Phone Number per check. For example, if two or more people, accounts, and/or devices are being used to pay a check, then there may be multiple Customer Phone Numbers utilized.

Alternate communication channels may replace the Customer Phone number, as they may replace the MPS phone number. Anything possible with or as the MPS Phone Number may be possible or as the Customer Phone Number.

In some embodiments, match processing is the basic linking of a customer to a check and may occur at the text payment server 105. For example, if an identifier or link to a check is available to a customer, the customer can provide that check identifier to the second phone number through a communications channel such as texting it from their phone to the MPS Phone Number. When the text containing the check identifier is received by the text payment server 105, the text payment server 105 obtains the check identifier and the customer identifier, e.g. the Customer Phone Number. Thus, the text payment server 105 can determine which check the customer wishes to pay.

In some embodiments, if the text payment server 105 receives a communication with the same check identifier from another Customer Phone Number (or communications channel), the text payment server 105 similarly knows that sender wishes to pay the check corresponding to the check identifier received.

In some embodiments, in the reverse direction, a Customer Phone Number can be provided to a text payment server 105 in conjunction with a check. For example, a restaurant employee or system may link one or more Customer Phone Numbers to a check. Thus, the text payment server 105 can recognize which customers want to pay for which checks. The text payment server 105 can send a communication such as a text to one or both of those Customer Phone Numbers with a link to view, interact with, adjust, pay, etc. the check.

In some embodiments, linking can occur when any information identifying a customer and their check is received with information that they are connected. For example, if it is known that a customer phone is in the same area as a table corresponding to a check, for example via indoor positioning technologies, then the text payment server 105 can link customer phones to that check In some embodiments, the text payment server 105 can obtain the location of the phone and know which bill it wants to pay.

In some embodiments, once the customer phone number and a check are linked, the text payment server 105 can initiate communication, such as a text, to the one or more customer phone numbers, providing them with a link or other information that allows them to view, pay and otherwise interact with their check. In some embodiments, the customer can also initiate communication, for example by texting the MPS phone number.

In some embodiments, the tab or check can additionally be requested from any system other than the restaurant POS that may have it, may request it, may calculate it, may receive all or part of it, etc. In some embodiments, it is possible that the restaurant POS sends additions, deletions, other changes and/or attributes to the MPS or a component that can communicate with the text payment server 105 as those additions, deletions, changes, etc. occur, or upon other criteria that cause this information to be transmitted, shared, or otherwise made available. For example, the restaurant POS can send increments of restaurant bill data, such as orders, adjustments, taxes, service fees, etc. as they are entered into the restaurant POS or a related system, in batches on a timer, upon any definable event, etc.

In some embodiments, any other way of the restaurant bill data being obtained by the text payment server 105 is possible. For example, the text payment server 105 could query the restaurant bill data, in whole or in part, at once or in combination, from the restaurant POS, a service that interfaces with a restaurant POS, or any other location. In some embodiments, restaurant bill data may be sent from the restaurant POS to the text payment server 105 or to a service or place from where the text payment server 105 may obtain it.

In some embodiments, it is also possible that all or part of the restaurant bill data may instead of and/or additionally, either in whole or in part, at once, or in combination come from a source other than the restaurant POS. For example, there may be another system or person or entity that has information about restaurant bill data and this data may be transmitted, directly or through one or more intermediaries, to the MPS or a system that interfaces with the MPS.

In some embodiments, beyond, instead of, or in addition to the text payment server 105 and/or its associated servers and system, all or part of restaurant bill data may be stored in any other location, service, or system whether in part or in whole and whether in duplicate in dispersal across multiple locations, services, or systems, or anywhere else and/or by any other means.

In some embodiments, the text payment server 105 may use data from other sources to generate the HTML view of the check.

For example, the text payment server 105 may generate a view in a format other than HTML. The text payment server 105 pay provide data that informs one or more other systems or devices such that they can present a view of the check in their native or another format. Formatting may additionally be provided, or the formatting may be determined by one or more other systems or devices.

For example, the text payment server 105 may provide JSON and/or or XML, data available via an API that allows an app on a mobile device to provide a check view. Data may be provided in any other formats besides JSON and/or XML. Data may be made available my methods other than APIs. Other types of web, Internet, telephony or other communications mechanisms may be used.

In some embodiments, check styling can be dynamic such that it can change any time. Changes can be automatic, according to an algorithm or communicated to the system via a person, other system, or anything else. For example, content for check styling, e.g. logos, fonts, images, etc. can be obtained automatically from any source or multiple of any sources. For example, all or part of this data could come from third-party databases, websites, etc.

In some embodiments, a native application could replace in whole or part the check microsite. For example, a native application running on a mobile device, for example an iPhone, iPad, Android, Windows, Blackberry, or other device such as a desktop or laptop computer could replace, augment, provide a portion or all of in addition to or instead of the check microsite.

In some embodiments, a link from a check microsite could lead, either directly or via one or more intermediaries, to a view of that check, a similar or related check, or any other reasonably related portion of a view, code, or functionality within an app running on a mobile device, for example via deep linking into an iPhone, iPad, or Android app.

In some embodiments, check adjustments can come in any way. It is possible that a customer could request a check adjustment of any form and there could be systems to automatically approve, deny, adjust, or otherwise respond to these requests, either automatically, according to one or more algorithms, or by relaying and/or obtaining information from a person with authority to respond to the adjustment request.

In some embodiments, links to anywhere else can also be generated, facilitated, and/or provided. A web link can become a deep link to any location, view or functionality within any app, for example any native app running on any mobile, desktop, or another device.

In some embodiments, links could be accompanied by any message before, along with, after, or otherwise with the link. Links could be transmitted or obtained in multiple parts. Links could be constructed via the text payment server 105, a third-party service, or any service of any kind.

In some embodiments, links could be transmitted by text messaging, or any means other than text messaging. Links and/or messages could be transmitted from messaging services like iMessage or Messages on a Mac or iOS device, Hangouts on an Android device, etc. Links and/or messages could be transmitted or otherwise made available in other apps or services, including messaging apps like WhatsApp, Facebook Messenger, or any other. Links and/or messages could be transmitted via other contact mechanisms, e.g. one or more email addresses, an ID on any system, etc.

In some embodiments, links and/or messages can be shared via any service or mechanism, including any non-technical communication format, such as verbal and/or visual means, printed means, displayed means, tactile means, etc. In some embodiments, the same link may go to the same check view, or a similar or alternate check view for anyone who clicks or otherwise follows or utilizes it. Links may change as interactions with the check view or microsite occur. In some embodiments, different links may be generated for different customers, different payers, etc.

In some embodiments, it is also possible that the customer could request the check at any time. It is possible that as items are ordered or added to the check, the restaurant POS sends such data to the MPS, either directly or via one or more intermediaries such as Omnivore. In some embodiments, any other entry point views or overlays may be presented prior, over, alongside, and/or in conjunction with the check presentation. In some embodiments, check presentation may also occur in any operating language in any code, for example as an app.

In some embodiments, multiple customers may have ordered items that are on the same tab. Sometimes, one customer will pay for the whole tab even if the tab includes orders from multiple customers.

In some embodiments, other times, customers sharing a tab may wish to split it. One way to split the tab is to let each item on a tab be associated with a customer. One way this can be facilitated is by one of the customers, or someone else with the appropriate knowledge, selecting items on the tab that they will pay for.

In some embodiments, the customer may be provided with the option to at a tip to the check prior to paying. For example, one option is that the customer may slide a dot or icon along an axis. One end of the axis represents zero tip, e.g. 0%, the other end of the axis can represent 100% or higher tip. There is an indicator of the dollar value and an indicator of the percentage of the bill that dollar value tip represents. For example, the dollar value represented by the location of the dot or icon along the axis could be displayed above the dot or icon, and the percentage represented by the location of the dot or icon along the axis could be displayed below the dot or icon. The axis could be of any geometric or dimensional nature, e.g. it could be an exponential 3D axis.

In some embodiments, there may be indicators along the axis at different points, for example to display recommended tip levels. These indicators may display according to any state. For example, they could always display, or they could only display if the dot is on or within a certain range of the respective point.

In some embodiments, other things could happen depending how the dot or icon is moved along the axis. For example, as the dot gets higher or further along one end of the axis, a positive graphical element could appear and change, e.g. a smiley face could appear and grow larger as the tip grows larger. As the tip gets lower, a frowning face could appear and grow larger.

In some embodiments, another thing that could happen is pressing and/or sliding the dot past one or more thresholds could trigger any event to occur, for example an option to enter a specific tip percentage or dollar amount, or a tip or dollar amount greater than presented in the axis originally may become available.

In some embodiments, anything could be programmed to happen according to any static or dynamic state of the dot or icon on the axis.

Present buttons could also appear with preset time amounts and percentages. The tip dollar amounts and/or percentages could be programmed by someone associated with the restaurant, or they could be set by the MPS or any other service or system that may or may not be integrated or interconnected with the MPS.

In some embodiments, may be possible that suggested tip amounts vary according to an algorithm. For example, if a tip goal is set, suggested tip amounts could increase or decrease to achieve and/or prevent overachievement of that goal.

In some embodiments, it may be possible that a customer could enter a dollar amount or percentage amount that they want to tip.

In some embodiments, it may be possible for other people to see what others tipped. This could be any collection of others, e.g. others paying for parts of the same check, others of similar demographics, others of different demographics, others in the restaurant, others within a particular time frame, others within other restaurants of any set, e.g. a chain or restaurant type.

In some embodiments, when a check is being split, it is possible that people paying portions of the check don't calculate tip appropriately. For example, one customer may elect to pay a straight dollar amount, then others pay the remaining dollar amount and leave tips only on the amounts they pay and excluding any tip on the amount paid by one or more people paying the straight dollar amount. This is because the straight dollar amount may go towards the amount due only.

In some embodiments, as people pay for parts of the check, indications of how much tip they leave could be displayed to others paying the same check. In return, suggested tip amounts for others could adjust so as to achieve one or more desired total tip amounts or percentages for the check overall.

In some embodiments, there could be a leaderboard of percentages or dollar amounts people are tipping in a restaurant during any period of time. Names, customer names, social avatars or other could be displayed alongside these. The leaderboard could be presented in the restaurant, on people's devices, or in any other location, to any audience, on any device, etc.

In some embodiments, it may be possible to show who is ordering what in a social way. For example, on a leaderboard in a restaurant, on a device, web app or native app or multiple of those used by multiple customers paying for a check, who have consumed items from the check, who are friends, family, acquaintances, etc. of people eating, paying for, or ordering these items. Posts could automatically be made to social media sites indicating who ordered what, who paid for what, where people ate, or any other similar information. For example, this automatic posting could lead to more visibility for the restaurant, chef, foods ordered, sources of the food, e.g. farms, etc. Photos of dishes, chefs, restaurants and/or links to them, their websites, and/or more information about them could also be posted.

In some embodiments, all of this data could be stored, for example in or across one or more databases. Discovery of other people could be possible based on who ate what. For example, a person could see who else ordered the same dish in the same restaurant. It may be also possible that the same dish in multiple restaurants could be compared. Dish identifiers could be established that are uniform across restaurants. In some embodiments, ingredient sources could be maintained and associated with each dish. Possibly this information could be provided by a restaurant POS or any other system that helps manage restaurant inventory, sourcing, workflow, etc.

In some embodiments, a supplier, such as a farm, could retrieve photos, consumers, and other data of and or related to how their ingredients were prepared into foods. Nutritional information could be compared and compiled automatically.

In some embodiments, if nutritional information is stored for dishes and/or for ingredients in dishes and nutritional information is known about those ingredients, then customers caloric and other nutritional intake could be automatically logged, manipulated, used for any calculation or other use and/or stored in or among one or more databases. A tally of a person's nutritional intake could be made available to social media sites, or other applications that track health.

In some embodiments, the costs of items could be tracked in the same ways as nutritional information. For example, tallies and analysis could be made and presented about how much various customers pay for various meals and/or dishes. These could be compared across restaurants serving the same or similar dishes and/or ingredients. These comparisons could also be made with dishes or ingredients prepared, purchased and/or consumed elsewhere, for example at home, from a grocery provider such as Amazon, or Blue Apron or grocery store such as Ralphs or Vons or any other market or farm or supplier.

In some embodiments, any payment processing option, technology, service, or etc. can be used. Payment could be processed by the restaurant's banking provider, the MPS banking provider or any other entity's banking provider, and/or any collection of companies that may work together to completely process a credit card or other form of payment.

Charges and/or surcharges and/or fees due to any party in any component of any of these transactions may be settled, tracked, paid, etc. in any part of this process, in whole or in part.

In some embodiments, the text payment server 105 may not close out the check in its entirety or at all. For example, the text payment server 105 may log payments made to the restaurant POS as alternate forms of payment and/or as forms of payment native to the restaurant POS and/or related systems and entities.

In some embodiments, offers or other communication could be communicated to the customer or customers via any communications channel, not just text. For example, email, messenger services and other communications services could be used for such communication. In some embodiments, the restaurant or one of its employees, agents, or representatives, or one or more of its services or systems, could text or otherwise send offers to customers to bring them back in.

For example, if one or more associated systems knows the quantity of a food or drink item in stock, the rate at which it is normally sold and/or restocked, the length of time before it is no longer tasteful or healthy or legal to serve, and the rate at which that item is currently being consumed or purchased, along with associated profit margins, then text offers could be sent to people who have ordered such items or ordered items that might suggest they like such items offering them various fractions of the margin, or the margin of what is likely to be a larger order, as a discount if they come back to the restaurant and make those or other purchases within a specified period of time, possibly also if they pay via a specified way, such as a system associated with the MPS.

As another example, if a restaurant is not at a desired capacity, offers could be sent to customers to bring them in with a discount. For example, a restaurant with several tables empty on a Monday at 6 PM might text a $5-off discount to customers who have opted in. It is also possible that capacity could be monitored automatically such that only a number of offers are sent that is statistically expected to bring in a desired quantity of customers. The number of customers coming in could be measured by one or more systems in real time to adjust outbound offers.

Another example, if there is a quantity of salmon that is aging and cannot be served past a given night, an offer may go out to customers who have ordered salmon in the past, or who have ordered something or dined with someone or otherwise done something or portrayed some characteristic that makes them have some likelihood of ordering salmon, offering them $10 off the salmon if they come and buy it within a specified time, e.g. one hour from a stated time, such as one hour from when the message was sent.

As yet another example, the quantity of consumption of salmon could be measured and the offer adjusted in real time. For example, if there are five salmon filets left and after sending a salmon offer to 10 customers, only one salmon filet remains, then no more offers for salmon would be sent if the statistical or other expected likelihood of that last salmon being ordered can already be reached, i.e. with the number of customers expected in that time frame, taking into account invitations sent, equals at least that last salmon being ordered.

In some embodiments, a customer could be asked if they want a copy of their receipt. This could be sent to them in any format over any means, e.g. text or emailed a PDF. A history of receipts could be maintained or shared automatically. This is possible because the phone number is a form of authenticating the customer and happens as part of the process of texting a link that a recipient subsequently clicks on. In some embodiments, if the system sends links to checks to different phone numbers, it can send a different link to each so that when each unique link is clicked each account can be authenticated.

In some embodiments, check views can be split in any way. Some examples may include: (1) that the code to the bill microsite can be shared with other customers/payers of the same check, (2) Tagging items on a check with identifiers of people, for example from contacts, social media handles, etc. in the bill can send them a check view or a link to a check view, possibly pre-calculated with their amount due based on what they were tagged on, (3) entering contacts or contact information, tagging people, etc. on the bill generally, which can forward them the check or links to the check, (4) selecting from among a proximity or locations of people, whether indoor and/or out, e.g. sharing the link with people nearby as can be facilitated by various technologies, possibly supported by any or multiple of GPS, Wi-Fi, Bluetooth and its variants, iBeacons, RFID, etc.

Some embodiments describe a mobile and/or desktop web app that displays a check and allows viewing, tagging, sharing, splitting, paying and/or any other combination of interaction. Other embodiments may include an app or application executing on a customer device that allows a customer to facilitates viewing of the check and/or some or every capability and/or more capabilities and view available in the check microsite. In some embodiments, deep linking can take a customer from links in text messaging flows, instant messenger process, email process, any communication process, any service, system, and/or application process to any part of that process and/or a related process in an app or other service or device.

In some embodiments, the entire payment process can occur without a customer having to register. This makes the process easier and faster for the customer (and easier to develop). This also affords the capability to authenticate customers. For example, if a unique link is sent to a customer phone number and that link is clicked, then it can be determined that phone number belongs to that customer. A customer account can automatically be created. This way information can be stored in a database that allows the customer to view bill history, provide a password, enter an email address, provide other means of contact, etc. so the customer can access their account safely in the future from other devices, means, etc.

In some embodiments, it is possible that when a customer access a URL or other link related to the MPS, information from their browser, system, apps, etc. could be retrieved to help identify that unique device and/or customer. At the end of a transaction, for example, a customer may be prompted to text their email address. We may then know which email address is associated with which customer phone number. We may send a confirmation email to that email address to verify.

In some embodiments, each time a link is forwarded, it is changed or caused to change, perhaps each time it is loaded on a system that can be identified as being different from another, such that we can have knowledge of identifications of different payers, viewers of the same or multiple checks.

In some embodiments, it is possible that the customer could receive a text (or similar) message from the MPS asking for contact information of people the first person would like to share the check with. For example, if a phone number or other identifying or contact information is received, that could be relayed back to the MPS and the MPS could issue a unique URL to those recipients to further identify different customers who are accessing the same check.

In some embodiments, restaurant employees and associates may have accounts with designated status of various tiers that allows them to configure or access various parts of the system or data associated with their restaurants, their customers, their other systems, etc.

In some embodiments, any action occurring on any part of the system, any data associated with it, etc. could be maintained in or across one or more databases. This data may be accessed at any time, for any reason, by any system, to do anything. For example, data could be used to produce reports, spend offers to special groups of customers, etc.

In some embodiments, the system may text the customer asking if they would like to receive special offers or discounts by text or other means from the restaurant. If the customer replies with acceptance. Then it will be noted in or across one or more databases their response.

The restaurant or a representative or other party may send offers to this list of customers who have opted in. For example, a text may be sent that says, "$5 off if you order something within the next hour." For example, the restaurant could be charged for sending these texts. The restaurant could be charged if it is determined these offers, e.g. the ones sent via texts, are used.

In some embodiments, a unique code may be included with the text, e.g. "23908A" that identifies the offer and whom it was sent to. This could be forwarded to others. When this code is forwarded to someone else (possibly via multiple people), and if the code is used, the person and/or people who forwarded it could receive a bonus, e.g. $1.

In some embodiments, "FriendForward" could encourage people to share deals to restaurants because, among other reasons like raising their social capital by knowing about a good deal, venue, etc., it could reward them financially. This service can be offered to a restaurant to draw in even more customers.

In some embodiments, the offer code can be associated with the check, perhaps when it is paid, to aid in the accounting of these offers, discounts, reward payments, etc. The offer code could be entered into a designated field in the check, into the restaurant POS, or anywhere else. It could be embedded into a URL or another link. In some embodiments, this could be integrated with any system, including systems external to the MPS. Social networks, messaging platforms, email systems, other communications systems, banking or financial systems, apps, etc. may be incorporated with this in any way.

In some embodiments, the customer device may interface with the text payment system via an app that can be anything. For example, a website or web app that is available and can be formatted to any size screen, a native iPhone, iPad, or Android app, a Windows or Mac app, and/or any other application or service that runs on any electronic and/or computing and/or another device.

In some embodiments, requests could be made to see previous transactions for a single or any set of customers, a to see how the bill is currently or was ultimately split, which parts may have remained or remain unpaid at any given time, which portions may have been paid in case, what the overall tip was, how the tip was distributed among payers, etc. This information could be shared with other systems, perhaps automatically, e.g. via social networking sites, or via other customers known to be paying or viewing the same check. Notifications could be sent at any time with any information relating to these systems, actions, or statuses. Messages could be, for example, "Jack just paid $23 for the salmon and added a $4.60 (20%) tip. The chicken and wine totals $28 and remains to be paid!" Another example, "Someone still owes $23 plus tax!" Another example could be, "Someone paid $17 in cash, left at the table." Any message of this variety is possible.

In some embodiments, biometrics can also be used to identify a customer to associate them with a check, table, order number, or another identifier. This information, for example, can be made available to the MPS and related systems, with translation to a form it can understand if necessary.

In some embodiments, a customer may be sitting at a table, and often tables have identifiers such as table numbers. Often table numbers are known to restaurant employees and systems, but are not directly visible to customers. In some embodiments, a tab may have an identifier such as a restaurant bill code, an order number, and a tab may have a table number, indicating that the tab belongs to a customer at the associated table. The customer may have a phone. Thus, there may be a tab, table number, phone number, and customer that all link, represent, or correspond to each other.

In some embodiments, there may be multiple tabs per table. For example, two customers at the same table may wish to have their own tabs. Typically, each tab has its own restaurant bill code. In this embodiment, it may be necessary to match a customer to the tab they wish to pay. This can happen in ways outlined in the Tab/Customer Match section, among others.

In some embodiments, a digital system could provide a menu that changes dynamically according to inputs, criteria of any kind, and/or algorithms. For example, if a system or individual reports that a menu item, perhaps one of its primary ingredients is no longer available, then it could cease to be displayed on the menu and/or cease to be orderable. This could occur with a visual indicator.

In some embodiments, when an ingredient in a menu item becomes no longer available, an indicator of such could appear on a menu and/or a different or modified recipe output could be listed.

In some embodiments, when market prices of ingredients change, the price of menu items could change.

In some embodiments, menu item prices could dynamically change according to supply and demand. For example, if a restaurant has availability of and/or ingredients to produce five of a menu item, the price of that menu item could go up as they are ordered and thus supply decreases. The same could happen if components of menu items get purchased. For example, if a certain amount of truffle is available in a kitchen, but truffle is available on two dishes, and one of the dishes has been ordered sufficiently to use a given amount of the truffle, then the other dish with truffle as an ingredient might go up in price. Alternatively, it's ingredients might change. The same might happen to the first item that includes truffle.

Token Payment Disclosure

The following disclosure describes a token payment system. Other embodiments of the invention are not limited to embodiments of describing a token payment system. However, various components, embodiments, examples, etc. of a token payment system may be implemented with other embodiments without limitation.

Figure 12:
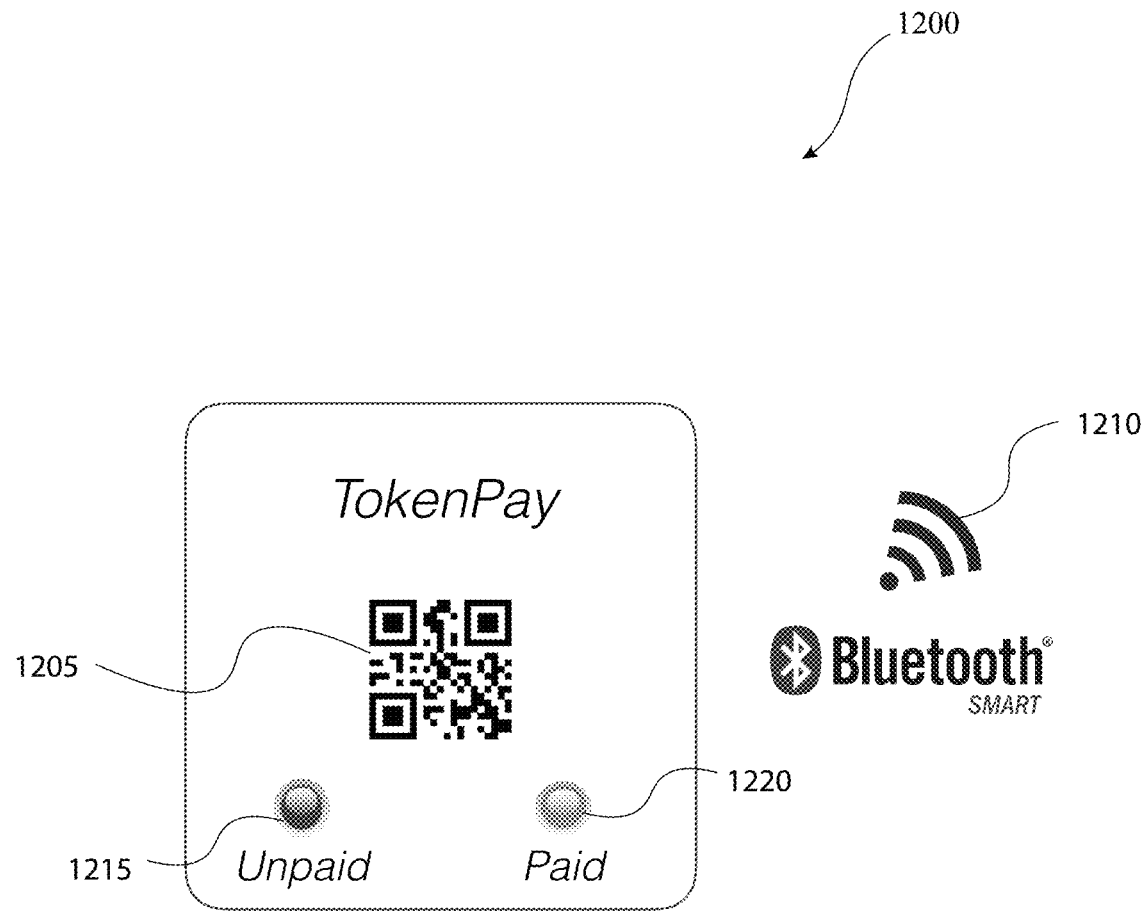
FIG. 12 is a diagram of an example token.

Some embodiments of the invention may include a token (possibly a physical device) that a customer can scan with their phone or other mobile device (or device of any kind) to pay a restaurant bill. A diagram of an example token 1200 is shown in FIG. 12. In some embodiments, a token may include (a) a computer-readable form of identification 1205, for example a QR code that constitutes a unique identifier for the token, (b) wireless capability 1210, e.g. Bluetooth Low-Energy, Wi-Fi, etc., (c) indicators, e.g. a red led light 1215 and a green led light 1220 or a display screen to indicate the payment status, and/or (d) a power supply and any other electronics and embedded software required to make the token work as proposed.

Some embodiments may include a token server (e.g., text payment server 105), which may include multiple servers working together. The token server may exchange data with other systems, servers, and devices, including but not limited to Restaurant Computer Systems, mobile devices belonging to restaurants, mobile devices belonging to customers, payment gateways, control systems, and others.

Restaurants often use any of a variety of computer systems, including apps, that enable servers to enter items ordered by customers, generate customer checks and process payments for checks, among many other capabilities. These can include computer systems associated with restaurants 130, 135, 140.

In some embodiments of this invention, an interface may exist for the Restaurant Computer System to exchange one-way or two-way data with the Token Server. Data may be exchanged via APIs or other communication interfaces. Any variety of data may be exchanged across one or more interfaces such as this one.

In some embodiments, data, likely to be outbound from the Restaurant Computer System, may include, for example, for a given party, items ordered by one or more people, prices for the items ordered, the table number, a restaurant bill code, the tax, the tip, the total amount due, date and time stamps related to the order, customer information, the number of people in the party, the identities of who ordered which items, etc.

In some embodiments, data, likely to be inbound to the Restaurant Computer System, may also include payment information, including information identifying one or more payment methods sufficiently for the payment to be processed, or sufficiently to indicate that a payment has successfully been processed, etc.

In some embodiments, a Restaurant Computer System might include or be one or more third-party systems in whole or in part. A Restaurant Computer System may provide any function whatsoever and does not need to be strictly a billing system.

In some embodiments, a Restaurant may or may not have one or more tablets or other mobile devices that can run the Token app. The Token app can be used by the restaurant whether its Restaurant Computer System interfaces with the Token Server or not.

In one use case, for example, if the Restaurant Computer System does not interface with the Token Server, a server may enter bill information directly into the Token app. Such information may include, but is not limited to: Table identifier, order identifier, guest identifier, price, tax, tip, or other charges or data. Once this is entered, it is associated with a token. It could be automatic once specific tokens are associated with specific tables, or the token identifier could be entered manually.

At this point, for example, the identified token receives communication over a wireless network, e.g. Bluetooth, that indicates the bill it represents is unpaid. The token may signal its unpaid status with a LED or other indicator, such as a built-in display.

One or more of any other type of device may interact with the system. For example, if a customer is paying to access a public restroom, an electronic lock (or device or system associated with a lock) may receive a command indicating that the cost of entry has been paid (whether confirmed by a payment gateway or not) so that it may unlock or contribute to unlocking the door. The same scenario may exist at an entry or exit turnstile, for example at the entrance or exit of an amusement park, transportation system, etc.

Figure 11:
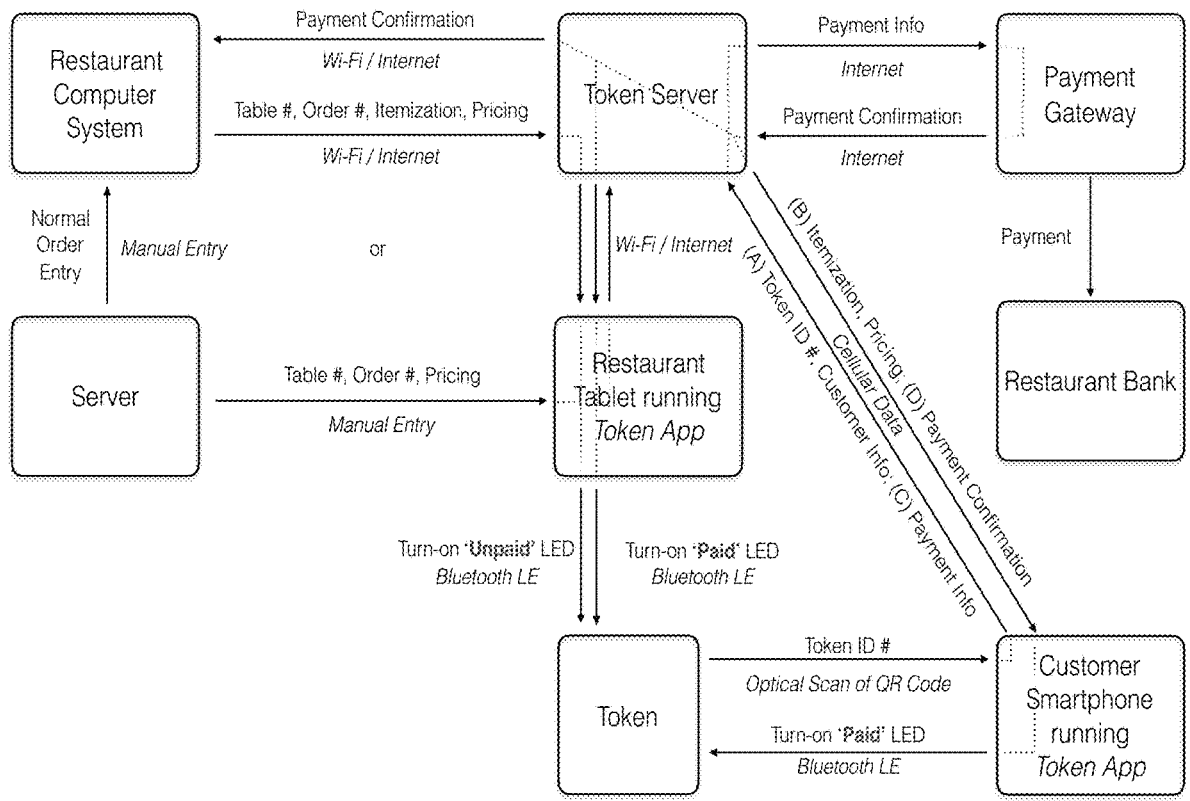
FIG. 11 is an example token payment process and system according to some embodiments.

FIG. 11 is an example token payment process and system according to some embodiments. One or more steps of the process in FIG. 11 may be implemented, in some embodiments, by one or more components of text payment system 100. Although illustrated as discrete blocks, various blocks may be divided into additional blocks, combined into fewer blocks, or eliminated, depending on the desired implementation.

In some embodiments, a token payment process may include one or more of the following in any order:
- A new party is created in the Restaurant Computer System.
- The new party is associated with a table number and/or a token number.
- The server enters orders as they come-in into Restaurant Computer System.
- The restaurant Computer System may communicate some or all of the above activities with the Token Server.
- The details of above activities may, for example, be communicated to a restaurant mobile device(s) at any time.
- The Token status may be set to unpaid (Signal is sent over Bluetooth, Wi-Fi, or other wireless channel from Restaurant Computer System, local router, Restaurant mobile device, etc.)
- When the Guest is ready to leave, the Guest may open the Token app on their mobile device.
- The Guest can scan the token with the app open on the mobile device, e.g. via camera looking at QR code on token.
- The Token app recognizes the unique identifier on the token, and can request the current bill from Token server.
- The token server may relay the bill related data back to Token app. This can include itemization of ordered items, tax, table number, along with any other attributes or data.
- The Customer can view the itemized bill and/or amount due on their mobile device.
- The Customer may select to pay all or part of the bill. If customer wants to pay part of the bill, they can select the items they want to pay for, in whole or any part, or enter the amount they want to pay total, or enter the percentage they want to pay total, or enter how much they want to pay by any other division. This makes it easier for a group of people to share a bill, etc. (Customer can also select to dispute any item on the bill or portion of the bill and provide an explanation.) (Customer might also be able to rate any item on the bill, or other items, such as service quality, timeliness of food delivery, etc. If any of this data is recorded, it may be displayed.)
- In some embodiments, other customers at the table may do the same thing and opt to pay part of the bill as well.
- The customer (or customers(s)) chooses a payment method. Payment method could be Apple Pay, PayPal, Venmo, Google Wallet, bank account, account number, reference number or code, or any other payment mechanism. Customer can also scan a credit card, front and optionally back using the mobile device camera. The device will read the credit card information and send it (or parts of it, possibly combined with other customer data and/or order data) to a payment gateway and/or the Token server for processing. A default or preferred payment mechanism could be stored such that the customer doesn't have to select a payment mechanism first, thus making their checkout process even faster.
- The payment gateway may process the payment.
- The payment gateway may notify the Token server of a successful payment. Either directly or via the Token server, the Restaurant Computer System and the Token app on the customer's mobile device may receive payment confirmation. Payment information could alternatively be submitted elsewhere, such as the Restaurant Computer System, a system associated with it, etc.
- Once the bill is paid in full, a signal may be sent from the Restaurant Computer System, a router, one or more restaurant mobile devices, as well as one or more customer mobile devices, over a channel, e.g. Bluetooth, to the token, causing the token to indicate the bill it represents has been paid, e.g. by turning off an unpaid LED and illuminating a paid LED. A display may act similarly. The signal may be sent from one or more devices, which may or may not be part of a mesh network, repeaters, or other.
- The customer(s) may then leave the table.

A token payment process where the Restaurant Computer System, for example, is not Integrated with Token System may include one or more of the following in any order:
- The server uses Token app on a mobile device (or other device) to associate a new party with table number and/or token number
- The server enters amount due and/or orders or line items into Token app. (This could happen multiple times.) Server could also enter codes that represent different items, e.g. "23" to represent item #23 on the menu. Details for these items, such as price, description, any other attributes, could be made available to the Token server or system.
- The token app communicates all of the above activities with the Token Server
- The Token status is set to unpaid (Signal is sent over Bluetooth, Wi-Fi, or other wireless channel from one or more Restaurant Computer Systems, local routers, Restaurant mobile devices, customer devices, any other computing device, etc.)

The Token status may be set to unpaid (Signal is sent over Bluetooth, Wi-Fi, or other wireless channel from Restaurant Computer System, local router, Restaurant mobile device, etc.)

When the Guest is ready to leave, the Guest may open the Token app on their mobile device.

The Guest can scan the token with the app open on the mobile device, e.g. via camera looking at QR code on token.

The Token app recognizes the unique identifier on the token, and can request the current bill from Token server.

The token server may relay the bill related data back to Token app. This can include itemization of ordered items, tax, table number, along with any other attributes or data.

The Customer can view the itemized bill and/or amount due on their mobile device.

The Customer may select to pay all or part of the bill. If customer wants to pay part of the bill, they can select the items they want to pay for, in whole or any part, or enter the amount they want to pay total, or enter the percentage they want to pay total, or enter how much they want to pay by any other division. This makes it easier for a group of people to share a bill, etc. (Customer can also select to dispute any item on the bill or portion of the bill and provide an explanation.) (Customer might also be able to rate any item on the bill, or other items, such as service quality, timeliness of food delivery, etc. If any of this data is recorded, it may be displayed.)

In some embodiments, other customers at the table may do the same thing and opt to pay part of the bill as well.

The customer (or customers(s)) chooses a payment method. Payment method could be Apple Pay, PayPal, Venmo, Google Wallet, bank account, account number, reference number or code, or any other payment mechanism. Customer can also scan a credit card, front and optionally back using the mobile device camera. The device will read the credit card information and send it (or parts of it, possibly combined with other customer data and/or order data) to a payment gateway and/or the Token server for processing. A default or preferred payment mechanism could be stored such that the customer doesn't have to select a payment mechanism first, thus making their checkout process even faster.

The payment gateway may process the payment.

The payment gateway may notify the Token server of a successful payment. Either directly or via the Token server, the Restaurant Computer System and the Token app on the customer's mobile device may receive payment confirmation. Payment information could alternatively be submitted elsewhere, such as the Restaurant Computer System, a system associated with it, etc.

Once the bill is paid in full, a signal may be sent from the Restaurant Computer System, a router, one or more restaurant mobile devices, as well as one or more customer mobile devices, over a channel, e.g. Bluetooth, to the token, causing the token to indicate the bill it represents has been paid, e.g. by turning off an unpaid LED and illuminating a paid LED. A display may act similarly. The signal may be sent from one or more devices, which may or may not be part of a mesh network, repeaters, or other.

The customer(s) may then leave the table.

The Token payment system, for example, can be used in environments outside of restaurants. It can be used for any situation where a customer wants to pay quickly or in the absence of an attendant. For example, this system could be used at a gas pump, a vending machine, a fast food drive-through, a transportation system such as a train, an amusement park, a ride in an amusement park, any kind of attraction, or any of infinite other situations. Payment could be taken at entry or at exit.

Payment could also be taken anytime between entry or exit, or before entry or after exit.

In some embodiments, payment could be used in a situation where paying immediately makes something available. For example, a token could be associated with a paid restroom. A mobile device could get the token identifier, e.g. via optical scan of the token's QR code or interrogating it via a wireless technology such as Bluetooth, send the token identifier and/or associated data to one or more servers such as the token server, at such a server, a system could determine the cost associated with use of what is gated by that token, for example that token identifier might be stored in one or more databases and a price associated with it in one or more of the same or different databases. (Other attributes might also be stored, e.g. name and description of the service or item, etc.)

In some embodiments, once the price is obtained from a server like a token server, the price could be sent to the mobile device. If the person wishes to accept the price, e.g. $0.50 to use the restroom, they can select or otherwise provide or make available any payment system or anything that references any payment system, have that be sent to a combination of a server like the token server and/or payment gateway servers or servers that lead to them, once a payment approval is obtained (or the system can be programmed not to wait for payment approval, e.g. in a case where the transaction amount is low enough that speeding the process might be possible by not waiting for approval), data signifying the approval or other acceptance of payment attempt can be sent back to the mobile device and/or any computer, router, ancillary device or other device or devices that can communicate with a system, e.g. an electronic lock wirelessly and cause it to unlock.

In some embodiments, the status at any step along the process could be recorded and/or displayed anywhere, e.g. on the token, on the lock, on any mobile device, computer, system, or router.

In some embodiments, a "token" can be used to reference different bills, items ordered, invoices, full or partial amounts due for products or services, etc. for one or more people. The identifier, for example, can be scanned electronically, e.g. optically by a device recognizing a QR code with its camera, or over RF by a device recognizing an identifier over Bluetooth, Bluetooth Smart or LE, Wi-Fi, ZigBee, RFID, or any other wireless technology.

The identifier, for example, can be close to or affixed to or otherwise associated with a specific person, table, bill, turnstile, door, or any other place, item or thing. The token, for example, can also be moved, e.g. delivered to one table with or as a bill, then later delivered to a different table with or as a bill. The token could be located at a register, handed to a customer at the point of ordering, etc.

In some embodiments, a first system may be used to associate bills, invoices, etc. with identifiers. The identifiers, for example, may be associated with, embedded in, on the surface of, or otherwise attached to any type of hardware device, e.g. a token. (Although this is not necessary. For example, the identifier could be a QR code printed on a receipt.) The relationship between bills and identifiers is stored on more or more servers, e.g. in a database, perhaps one termed a token server.

A second system, e.g. a customer mobile device, may be used to obtain a specific identifier by scanning the device containing it, e.g. reading the QR code on a token. (The customer mobile device could also obtain the token's identifier via any wireless technology, e.g. Bluetooth, RFID, etc.) The customer mobile device may contact the server that stores relationships between identifiers and bills, and retrieves information about any set of bills associated with the identifier. For example, the customer mobile device could retrieve a current unpaid bill. Timestamps associated with bills, items ordered, etc. could assist in the determination of the current unpaid bill, along with other data.

In some embodiments, the customer mobile device can display any information related to the bill. For example, any date and timestamp, the amount due, the tax, itemization of what comprises the bill, the size of the party, the name of the server, etc. The customer can select the portion of the bill, e.g. by specifying a dollar amount or selecting items from the itemization to pay, optionally supplying a tip or other payment component, seeing the total amount of those combined, then selecting a payment method, e.g. Apple Pay, a credit card via optical scan, PayPal, Venmo, Google Wallet, a bank account, or any other payment source, reference, or mechanism available.

In some embodiments, payment information can be sent from the customer mobile device to one or more servers, e.g. to the token server and/or a payment gateway, data either in whole or part to either or both, such that a payment confirmation can be obtained and the payment processed. It is also possible that a customer is identified automatically and that customer's payment options are obtained and displayed for selection. In some embodiments, a preferred payment option may be set or chosen so the customer can pay without having to first pick a payment method. In some embodiments, communications to any server or device may require one or more intermediate communications with other servers, devices, or systems.

In some embodiments, one or more payment destinations may be provided for a merchant, such that the payment, minus any transaction or other intermediary cost or costs, is delivered to that destination, e.g. to the merchant's bank.

In some embodiments, once the payment confirmation is generated, it can be shared with other destinations, either directly or via intermediate stops. Recipients, whether the data is delivered to them or they request it, may include the token server, the customer mobile device, and any other device interconnectable with this system, e.g. a merchant mobile device, a merchant computer system, etc.

In some embodiments, payment confirmation is sent to the device containing the identifier, e.g. the token. The confirmation may arrive via any method, e.g. wirelessly via Bluetooth, Bluetooth LE, RFID, In some embodiments, ZigBee, Wi-Fi, cellular network or any other wireless method. Once sufficient payment confirmations have arrived at the device to indicate that at least the entire amount due has been paid, for example, the device may display an indicator of such. For example, the device could illuminate a 'paid' indicator LED and/or extinguish an 'unpaid' indicator LED. In some embodiments, this indication doesn't have to be LED, but could be any other type of indicator as well, e.g. a screen or other display. It could even be a relay of data or information to one or more other destinations.

In some embodiments, the process can repeat with a new bill becoming associated with the same identifier, followed by any or all or more steps above. This could occur after the outstanding bills associated with the token are marked 'paid.' It could also happen after outstanding bills associated with the token have been left marked 'unpaid." This might be the case if one or more customers left before paying all or part of their bill, but subsequently the restaurant or a server utilized it for another person, table, bill, party, etc.

In some embodiments, a bill could be anything that indicates items ordered and/or amounts due, or any other item or service that can be associated with a cost or fee, whether paid yet in whole or fraction or not. A bill could also be a fare, an invoice, a receipt, a cost of entry, a cost of usage, or any other cost, fee, or monies or representations of monies imaginable.

In some embodiments, multiple bills can be associated with an identifier and/or token. They can have different characteristics, details and/or states of existence that can be used to obtain the bill(s) desired for any purpose. For example, all unpaid bills for a time period like the last 90 minutes could display. If this means multiple bills, the customer or another system can choose which one to pay. For example, two parties may be sitting at the same table that has a single token and identifier. Both bills could be associated with the same token and identifier, then each party can scan the token, see both bills, pick their bill, and then pay it. Only once all bills are paid, for example, will the indicator on the token change to indicate paid. Or a more advanced indicator could present the number of current unpaid bills, the current paid bills, the amount of money paid and/or remaining due, or any other information.

In some embodiments, the identifiers can be associated with other identifiers. For example, an identifier of a token could be associated with a table number in a restaurant, a gas pump number at a gas station, a turnstile, a door, any other object imaginable, etc. They can be associated with any other identifier as well.

In some embodiments, the identifiers for tokens can be unique to a venue or unique to any subset of tokens in existence, or they could be unique among all tokens in existence.

In some embodiments, a token could have one or more identifiers, e.g. identifier 1 for person 1 and identifier 2 for person 2.

In some embodiments, identifiers can be changed at any time, manually and/or automatically, e.g. set to some criteria. For example, identifiers could be changed after a preset time period has elapsed, or based on time of day, or based on any other criteria or algorithm. This may serve any purpose, for example security by mixing-up which identifiers are used to make it harder to cheat the system in any imaginable way.

In some embodiments, tokens could also automatically change or display their identifiers. For example, a token could have a screen, e.g. an e-ink or other screen, that can show different identifiers or different QR codes at different times.

In some embodiments, tokens may be able to identify the people and/or parties at the table. For example, if the token recognizes a customer's mobile device in the vicinity, it can identify, store, utilize, share, manipulate, or do anything else with or to that information.

In some embodiments, tokens may interface with beacons. Data may be obtained and/or exchanged with beacons and/or other devices, networks, and/or systems. Tokens may interface with any other devices or systems.

In some embodiments, tokens can include only of an identifier, e.g. a QR code, which may be printed or projected on any object, for example printed on a receipt. In this case, the token may not be able to display any of its status. However, other devices can maintain and communicate its status, for example using a combination of servers, wireless networks, and computing devices such as customer and restaurant mobile devices.

For example, an identifier, e.g. a QR code could exist as being printed on an object, e.g. paper. One system or device, e.g. a restaurant computer system and/or mobile device could associate data with that identifier. This association could be stored in a server, on a database, etc. A customer mobile device could, for example, scan the identifier, e.g. the QR code. The customer mobile device could, for example, relay the identifier or a representation of the identifier to another service, server, network, or system that has the associated data. The associated data could, for example, include an itemized bill, for example. The mobile device could them receive and display the itemized bill. The customer could, for example, select or have automatically selected some payment mechanism. The payment mechanism and related data could, for example, be sent to one or more servers, e.g. the token server, the restaurant computer system, the restaurant mobile device, a payment gateway, etc. Then a payment could, for example, be processed. An indication of whether the payment was attempted and/or successful or not could then be made available or related to one or more other servers or systems, e.g. to a token server and/or a restaurant computer system, a restaurant mobile device, or a customer mobile device.

In some embodiments, one or more of those devices could then display or indicate the bill status, e.g. "paid" or "unpaid." Thus, for example, the identifier itself, e.g. the QR code, does not have to be affixed to, connected to, or otherwise part of or associated with an electronic device directly.

In some embodiments, tokens may also allow ordering. One or more menus could be associated with a token or set of tokens. A customer could scan a token, which would enable it to request the information constituting the menu items available at the place of the token or another place. A customer could do this by scanning the token with its mobile device, the mobile device obtaining the token's identifier or a representation of its identifier, the mobile device making a request, likely over one or more wireless or wired networks, that includes of the token identifier and the request for menus available. The token server or any other server, possibly by way of one or more other servers, systems, or networks, can then send any portion, or all of, any, or any number of menus available. Menu selection can be automatic, e.g. a lunch menu could be retrieved and displayed during programmed lunch hours, e.g. 11:30 AM-2 PM local time.

In some embodiments, the restaurant or its affiliate or another entity can store menus in a server such as the token server. They could enter them using a restaurant mobile device, a restaurant computer, or any other device or system. In some embodiments, menus could be optically or otherwise scanned. The menu information could be provided to the token server for storage, or it could be stored on any other system or device, and the token server could be instructed on how to obtain it when needed, or a customer mobile device could request and/or obtain the menu data from another server, system, or device. In some embodiments, instructions on where to obtain it are provided or otherwise made available. This allows a mobile device, such as the customer mobile device, to obtain the menus.

In some embodiments, menus can contain any information, e.g. titles, descriptions, images, videos, files of any kind, nutritional information, ratings, suggested pairings, preparation times, lists of people in any category, e.g. friends, who've ordered that item, other places to obtain that item, the time required to prepare and deliver the item for consumption, the price of the item, the seasonality of the item, or any other information whatsoever.

In some embodiments, a token can be embedded at least partially within, attached to, or in any way associated with anything. For example, a token could be embedded or attached to a portfolio, a tray, a clip, etc. These might be items delivered to a table with a bill. As another example, a token could be affixed to a turnstile, an entry or exit point, a door, a path or road, a sign, a transportation device, a seat, a table, a floor, a ceiling, a wall, a window, a watch, or any other physical or non-physical object imaginable.

In some cases, it may be necessary to determine which token is associated with which table, bill, or customer.

For example, a waiter may go to the restaurant's restaurant POS to enter components of (e.g. line items or items ordered) or complete a bill. That bill may be for a table #3. The waiter then selects a token from a stack of tokens. The token may have a unique identifier (within the restaurant, serving area, or any other set) F. Somehow, Token F needs to relate to the bill for Table #3.

One way to do this, for example, is for the waiter to enter a line item on the bill with the token identifier and a zero price. For example, the waiter could add 'Token F @ $0' (notation can vary) onto the bill for Table #3. Then when the token server accesses that bill, it can look for the token identifier and see the table number (which is a default part of many restaurant POS) and know that when Token F is scanned (its identifier queried, possibly by a diner wanting to pay for their meal), the current/open bill (or multiple bills for the same table if applicable) for Table #3 should be presented.

This approach makes it easier for the token system to work with the Restaurant POS. This is because the restaurant POS does not need customization (which can be costly, time-consuming, or even not possible or available) to otherwise be able to associate tokens with tables, bills, specific diners or groups of diners, etc.

Figure 13:
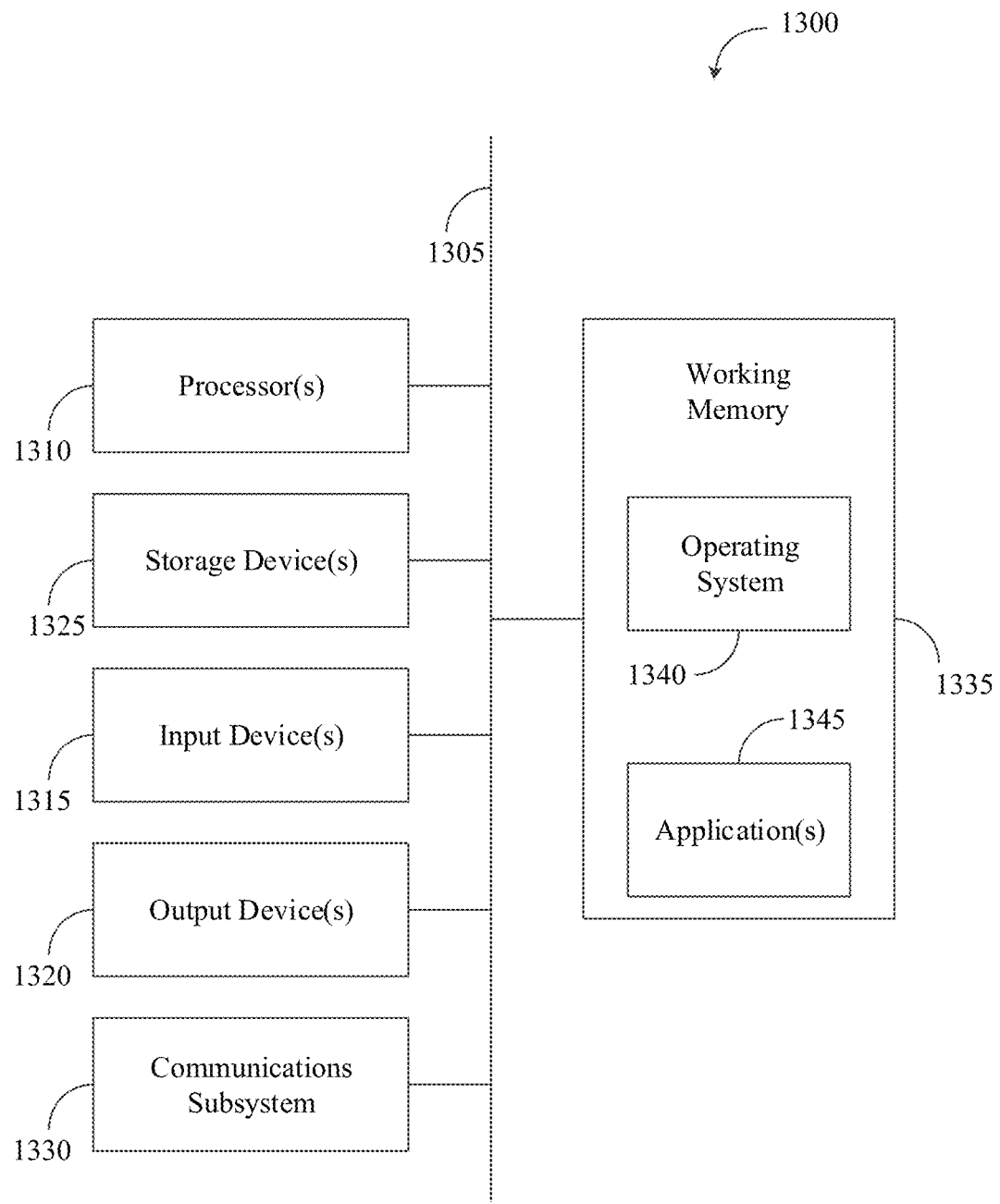
FIG. 13 shows an illustrative computational system for performing functionality to facilitate implementation of embodiments described herein.

The computational system 1300 (or processing unit) illustrated in FIG. 13 can be used to perform and/or control operation of any of the embodiments described herein. For example, the computational system 1300 can be used alone or in conjunction with other components. As another example, the computational system 1300 can be used to perform any calculation, solve any equation, perform any identification, and/or make any determination described here.

The computational system 1300 may include any or all of the hardware elements shown in the figure and described herein. The computational system 1300 may include hardware elements that can be electrically coupled via a bus 1305 (or may otherwise be in communication, as appropriate). The hardware elements can include one or more processors 1310, including, without limitation, one or more general-purpose processors and/or one or more special-purpose processors (such as digital signal processing chips, graphics acceleration chips, and/or the like); one or more input devices 1315, which can include, without limitation, a mouse, a keyboard, and/or the like; and one or more output devices 1320, which can include, without limitation, a display device, a printer, and/or the like.

The computational system 1300 may further include (and/or be in communication with) one or more storage devices 1325, which can include, without limitation, local and/or network-accessible storage and/or can include, without limitation, a disk drive, a drive array, an optical storage device, a solid-state storage device, such as random access memory ("RAM") and/or read-only memory ("ROM"), which can be programmable, flash-updateable, and/or the like. The computational system 1300 might also include a communications subsystem 1330, which can include, without limitation, a modem, a network card (wireless or wired), an infrared communication device, a wireless communication device, and/or chipset (such as a Bluetooth® device, an 802.6 device, a Wi-Fi device, a WiMAX device, cellular communication facilities, etc.), and/or the like. The communications subsystem 1330 may permit data to be exchanged with a network (such as the network described below, to name one example) and/or any other devices described herein. In many embodiments, the computational system 1300 will further include a working memory 1335, which can include a RAM or ROM device, as described above.

The computational system 1300 also can include software elements, shown as being currently located within the working memory 1335, including an operating system 1340 and/or other code, such as one or more application programs 1345, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1325 described above.

In some cases, the storage medium might be incorporated within the computational system 1300 or in communication with the computational system 1300. In other embodiments, the storage medium might be separate from the computational system 1300 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1300 and/or might take the form of source and/or installable code, which, upon compilation and/or installation on the computational system 1300 (e.g., using any of a variety of generally available compilers, installation programs, compression/decompression utilities, etc.), then takes the form of executable code.

Figure 14:
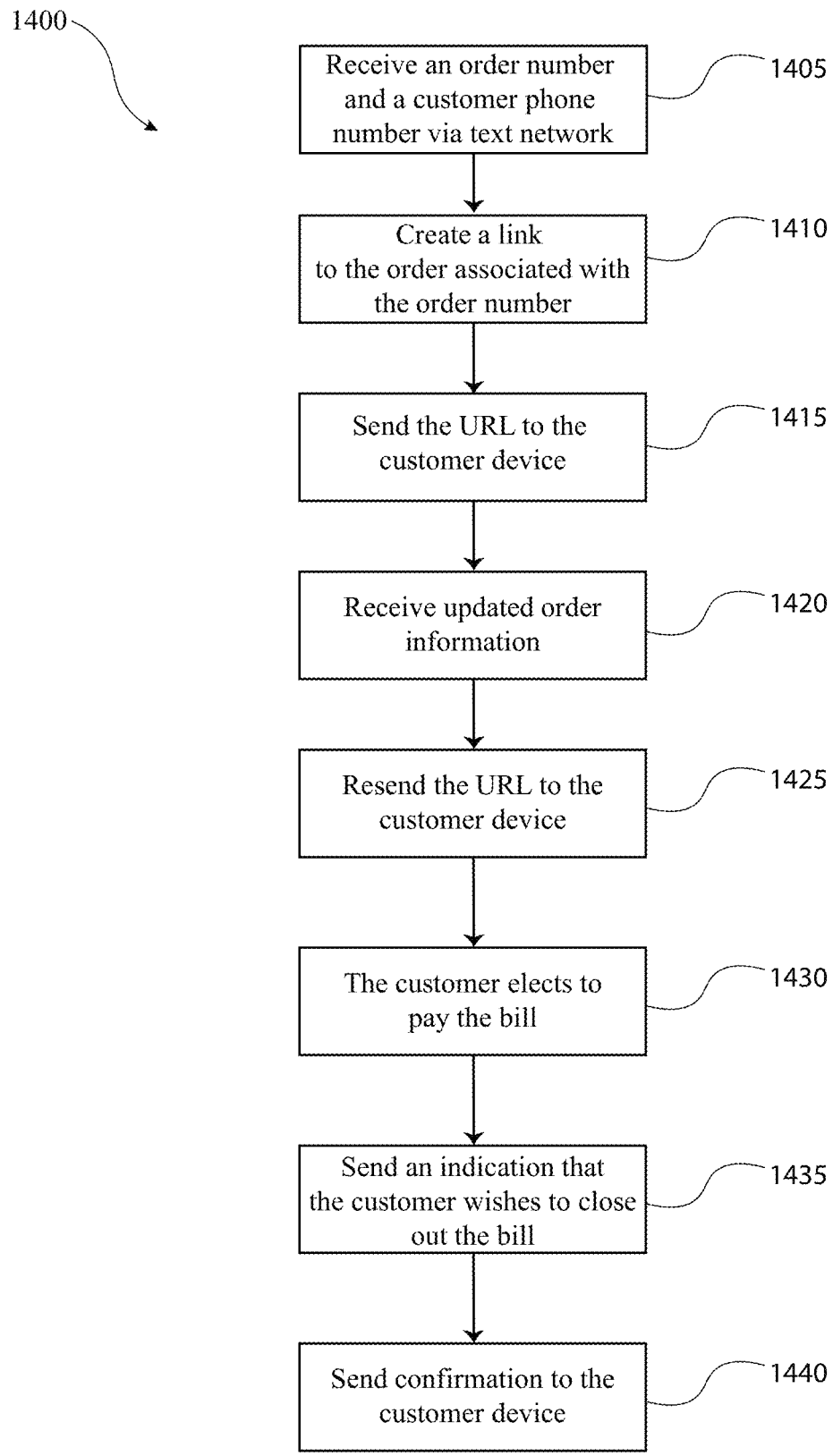
FIG. 14 is a flowchart of an example process for processing a restaurant check via text message, according to at least one embodiment.

FIG. 14 is a flowchart of an example process 1400 for processing a restaurant check via text message, according to at least one embodiment. One or more steps of the process 1400 may be implemented, in some embodiments, by one or more components of text payment system 100, such as text payment server 105. Although illustrated as discrete blocks, various blocks may be divided into additional blocks, combined into fewer blocks, or eliminated, depending on the desired implementation. Some blocks may occur at the same time or in different order.

Process 1400 begins at block 1405 where the text payment server 105 receives a message with an order number and a customer phone number via the network 125. For instance, when a customer orders a meal and/or a drink, the customer may provide their phone number. The restaurant may create an order number associated with the customer that may be used to keep track of the customers tab. The order may include the order number, the customer phone number, and/or the menu items ordered by the customer. The restaurant may have received the customer's credit card information when the customer received the customer phone number.

In some embodiments, the restaurant POS may automatically send the message to the text payment server 105 once the order has been created. In some embodiments, the message may be sent via any electronic communication protocol At block 1410 the text payment server 105 may create a unique URL (or link) to the order. At block 1415 the link may be sent to the customer using the customer phone number using a network that includes a text message network. For example, the unique URL may be sent as a text message to the customer. The unique URL, for example, may point to a webpage that can display the customer order. For instance, the unique URL may include the order number or a code of the order number as part of the URL. At block 1415, the text payment server 105 may send the unique URL to the customer device using the customer phone number such as, for example, via the text server 155.

As the customer dines and/or drinks the order may be updated. In some embodiments, updated order information may be received at the text payment server 105 at block 1420. The updated order information may be used to produce and/or update the webpage displaying the order information. At block 1425 the text payment server 105 may resend the link to the customer device using the customer phone number such as, for example, via the text server 155.

In some embodiments, whenever the user selects the link, the webpage may display the updated order.

In some embodiments, the unique URL can point to a unique webpage (or a series of webpages) that can be created at block 1415, or created when the URL requested by a customer device. The unique URL, for example, when entered into a web browser (or any other application) may request a webpage (or a series of webpages) that when displayed on the customer device may include at least a portion of the restaurant bill data and/or a signature field, these various fields may be on different webpages that can be accessed by the customer using the link. Various other data and/or fields may be presented as well as part of the webpage (or a series of webpages). In some embodiments, a tip field may also be presented to the user as part of the webpage.

In some embodiments, the unique URL may include data (e.g., text, code, etc.) that when sent to the text payment server 105 and/or the web server 160, the text payment server 105 and/or the web server 160 can lookup restaurant data, the restaurant bill data, the total amount, tax information, etc. and create a webpage that can display the restaurant data, the restaurant bill data, the total amount, tax information, etc. and/or allow the customer to pay the restaurant bill.

In some embodiments, the webpage can be created and stored in a database when the unique URL created. Then, when the unique URL is received at the text payment server 105 and/or the web server 160 the webpage can be retrieved from the database and sent to the customer device.

In some embodiments, the webpage may include a webpage, code on a webpage, or a portion of webpage that may allow a customer to pay tip such as, for example, as shown in FIG. 6 and FIG. 7.

In some embodiments, the unique URL, for example, may be sent in the body of the text message. In some embodiments, the unique URL may be shortened prior to sending, for example, using bit.ly, Hootsuite, Google, TinyURL, t.co, ow.ly, or another URL shortening service.

In response to receiving the unique URL, the customer may elect to pay the bill at block 1430. Because the customer previously provided credit card information the customer need not provide the credit card information via the webpage. For example, the customer may select the unique URL and view the associated webpage that includes at least a portion of the restaurant bill data and select a button that communicates to the text payment server 105 that the customer elects to close out the tab and pay for the order or part of the order. In some embodiments, the customer may also enter a signature via a touch screen. In some embodiments, the customer may enter a tip amount. In some embodiments, the customer device may send the indication, the tip amount, and/or the total payment amount.

In some embodiments, the signature data may be received at the text payment server 105. In some embodiments, the text payment server 105 may also receive a photograph of the customer from the customer device. In some embodiments, the text payment server 105 may also receive an image of a signature entered by the customer at the customer device. In some embodiments, the text payment server 105 may also receive geolocation data from the customer device. In some embodiments, a tip amount may be received at the text payment server.

At block 1435, the text payment server 105 may send an indication to the restaurant that the customer wishes to close out the bill. The indication may include a message that instructs the restaurant data server and/or restaurant POS to charge the customer's credit card. In some embodiments, the indication may include a total amount and/or a tip amount. In some embodiments, the indication may include the image of the signature, geolocation data, and/or a photograph.

In some embodiments, at block 1440 a payment confirmation code, confirmation information, some related confirmation code, or a receipt can be sent to the customer via any network. In some embodiments, the confirmation code or information can include instructions to the customer to write the code on the physical check (or whatever) and give it back to the restaurant on their way out so the restaurant can have confirmation of payment.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-included sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:

1. A restaurant processing method comprising:
   creating, at a restaurant computing system, a unique URL that includes a restaurant bill identifier that identifies a specific restaurant bill at a specific restaurant;
   receiving, at a first computing system, a request for a webpage associated with the unique URL from a user device;

sending a request to the restaurant computing system for the specific restaurant bill using the restaurant bill identifier;
receiving the specific restaurant bill at the first computing system from the restaurant computing system, the specific restaurant bill including at least one restaurant menu item and at least one price for the at least one restaurant menu item;
creating at the first computing system one or more webpages with the specific restaurant bill that includes the at least one restaurant menu item, the at least one price for the at least one restaurant menu item, and a credit card payment field;
sending the one or more webpages to the user device from the first computing system;
receiving credit card information from the user device via the one or more webpages; and
sending the credit card information to a credit card processing system.

2. The restaurant processing method according to claim 1, further comprising sending a confirmation code to the user device indicating that a transaction has been completed successfully.

3. The restaurant processing method according to claim 1, wherein the credit card processing system comprises at least in part the restaurant computing system.

4. The restaurant processing method according to claim 1, wherein the credit card processing system comprises a third-party credit card processing system.

5. The restaurant processing method according to claim 1, wherein the restaurant computing system comprises a point of sale device.

6. The restaurant processing method according to claim 1, further comprising:
receiving geolocation data from the user device; and
sending the geolocation data to the restaurant computing system or the first computing system.

7. The restaurant processing method according to claim 1, wherein the webpage includes a tip entry field, and wherein a total bill amount is dynamically calculated based on entries in the tip entry field and presented on the webpage.

8. The restaurant processing method according to claim 1, wherein the credit card payment field includes an option to pay using Apple Pay, Venmo, or Google Wallet.

9. The restaurant processing method according to claim 1, further comprising printing the unique URL as a QR code on a physical medium.

10. The restaurant processing method according to claim 1, wherein the unique URL was scanned by the user device.

11. A method comprising:
creating, at a restaurant computing system, a unique URL that includes a restaurant bill identifier that identifies a specific restaurant bill at a specific restaurant;
printing the unique URL as a QR code on a physical medium;
receiving, at a first computing system, a request for a webpage associated with the unique URL from a user device;
sending from the first computing system a request to the restaurant computing system for the specific restaurant bill using the restaurant bill identifier;
receiving the specific restaurant bill at the first computing system from the restaurant computing system, the specific restaurant bill including at least one restaurant menu item and at least one price for the at least one restaurant menu item;
creating one or more webpages with the specific restaurant bill include the at least one restaurant menu item, the at least one price for the at least one restaurant menu item, a tip entry field, and a total bill amount that is dynamically calculated based on entries in the tip entry field;
sending the one or more webpages to the user device;
receiving payment information from the user device via the webpage; and
sending the payment information to a payment processing system.

12. The method according to claim 11, wherein the one or more webpages includes a signature entry field.

13. The method according to claim 11, wherein the one or more webpages further comprises a payment entry field.

14. The method according to claim 11, wherein the one or more webpages further comprises an option to pay using Apple Pay, Venmo, or Google Wallet.

15. The method according to claim 11, further comprising:
receiving geolocation data from the user device; and
sending the geolocation data to the first computing system.

16. A method comprising:
creating, at a restaurant computing system, a unique URL that includes a restaurant bill identifier that identifies a specific restaurant bill at a specific restaurant;
receiving, at a first computing system, a request for a webpage associated with a unique URL from a user device, wherein the user device retrieved the URL by scanning a QR code;
sending a request, from the first computing system, to the restaurant computing system for the specific restaurant bill using the restaurant bill identifier;
receiving the specific restaurant bill at the first computing system from the restaurant computing system, the specific restaurant bill including at least one restaurant menu item and at least one price for the at least one restaurant menu item;
creating one or more webpages, at the first computing system, with the specific restaurant bill include the at least one restaurant menu item, the at least one price for the at least one restaurant menu item, a tip entry field, and a total bill amount that is dynamically calculated based on entries in the tip entry field;
sending the one or more webpages from the first computing system to the user device;
receiving payment information from the user device via the webpage;
sending the payment information to a payment processing system; and
sending a confirmation code to the user device indicating that a transaction has been completed successfully.

17. The method according to claim 16, wherein the one or more webpages includes a signature entry field.

18. The method according to claim 16, wherein the one or more webpages further comprises a payment entry field.

19. The method according to claim 16, wherein the one or more webpages further comprises an option to pay using Apple Pay, Venmo, or Google Wallet.

20. The method according to claim 16, wherein creating the one or more webpages, at the first computing system, further comprises:
looking up a logo associated with a restaurant; and
adding the logo to the one or more webpages.

* * * * *